(12) United States Patent
Tamatsu

(10) Patent No.: US 7,505,979 B2
(45) Date of Patent: Mar. 17, 2009

(54) DATABASE ACCELERATOR

(75) Inventor: Masaharu Tamatsu, Tama (JP)

(73) Assignee: Annex Systems Corporation, Tokyo (JP)

( * ) Notice: Subject to any disclaimer, the term of this patent is extended or adjusted under 35 U.S.C. 154(b) by 0 days.

(21) Appl. No.: 10/532,372

(22) PCT Filed: Oct. 21, 2003

(86) PCT No.: PCT/JP03/13443

§ 371 (c)(1),
(2), (4) Date: Oct. 11, 2005

(87) PCT Pub. No.: WO2004/036432

PCT Pub. Date: Apr. 29, 2004

(65) Prior Publication Data

US 2006/0129565 A1    Jun. 15, 2006

(30) Foreign Application Priority Data

Oct. 21, 2002  (JP)  ............................. 2002-306296

(51) Int. Cl.
*G06F 17/30* (2006.01)
*G06F 15/16* (2006.01)

(52) U.S. Cl. ........................................ 707/100; 707/2

(58) Field of Classification Search ................. 707/205, 707/2, 317; 711/221, 173; 395/600
See application file for complete search history.

(56) References Cited

U.S. PATENT DOCUMENTS

| | | | |
|---|---|---|---|
| 5,544,357 A * | 8/1996 | Huei | 707/2 |
| 2001/0011321 A1 * | 8/2001 | Tamatsu | 711/104 |
| 2003/0013445 A1 * | 1/2003 | Fujiwara et al. | 455/435 |
| 2003/0158842 A1 * | 8/2003 | Levy et al. | 707/3 |

* cited by examiner

*Primary Examiner*—Charles Rones
*Assistant Examiner*—Fariborz Khoshnoodi
(74) *Attorney, Agent, or Firm*—Apex Juris, pllc; Tracy M. Heims

(57) ABSTRACT

While scalability in database processing may be achieved gradually and at low cost, to achieve high scalability of several thousand times. This database accelerator holds on an accelerator system copies of location tables, which correspond to primary-key indices, and alternate-key location tables, which correspond to alternate-key indices, for a primary system that performs data updates. When a location table or alternate-key location table on the primary system is modified, updates are synchronized to the location table and alternate-key location tables on the accelerator system. The data itself is held only on the primary system. Major improvements in processing capabilities are achieved over serial processing by distributing processing requests among accelerator systems.

2 Claims, 23 Drawing Sheets

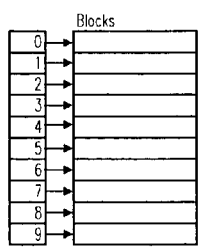
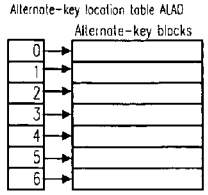
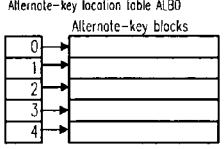
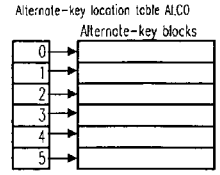
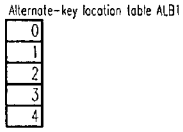
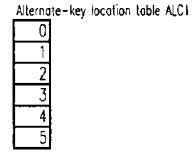
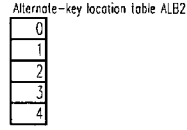
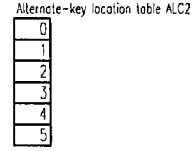
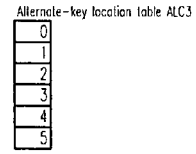
FIG. 15

DATABASE ACCELERATOR

BACKGROUND OF THE INVENTION

1. Field of the Invention

The invention pertains to data storage and retrieval methods and systems in the field of computers and has the particular objective of achieving high scalability (the expansion of processing capability) in data storage and retrieval. Scalability is the expansion of processing capability. The invention pertains to the improvement of database system performance in providing to a given database system with a certain level of performance processing capability of from several times to several thousand times greater performance.

2. Description of Related Art

As described in Jeffrey D. Ullman, *Deetabeesu Shisutemu no Genri* [Principles of Database Systems] (trans. Kunii et al, Nihon Konpyuutaa Kyokai, 25 May 1985, pp. 45-71), Samuel Leffler et al, UNIX 4.3 BSD no Sekkei to Jissou [The Design and Implementation of UNIX 4.3 BSD] (trans. Akira Nakamura et al, Maruzen K. K., 30 Jun. 1991, pp. 193-191) and Michael J. Folk et al, "Fairu Kouzou" [File Structures], bit (trans. Hiroyuki Kusumoto, Kyouritsu Shuppan K. K., 5 Jun. 1997, pp. 169-191), conventional database storage and retrieval with computers has basically employed hierarchical indices.

The inventor has invented a Data Storage and Retrieval System (Japanese Patent 3345628, U.S. Pat. No. 6,415,375 and U.S. Pat. No. 6,584,555) that achieves high performance and ease of maintenance with the introduction of the concepts of location tables and alternate-key tables instead of conventional hierarchical indices, simplification of the complex processing entailed in processing indices and the employment of binary search techniques to search the tables themselves.

In the invention of a Database Reorganization System and Database (PCT/JP03/11592) (below referred to as the Database Reorganization System), the inventor has further proposed a framework for performing reorganization of the databases of the Data Storage and Retrieval System while such a database is in operation. The inventor shows that the addition of alternate-key location tables to alternate-key tables enables efficient reorganization.

A brief description follows of the Data Storage and Retrieval System proposed by the inventor. The data storage and retrieval systems of the invention use location tables and alternate-key tables and perform binary searches on these to retrieve target records.

Data records are stored in primary blocks in the order of their primary keys. When a primary block is full and a data record is added to that primary block, an overflow block is linked to that primary block and the data record stored therein. A further overflow block may be linked to an overflow block.

Location table records (or location table entries) that contain the addresses of the primary blocks are held in a location table that occupies a contiguous region.

A location table is secured beforehand in a contiguous region. This contiguous region is one of logical order and may span separated physical regions. If so, an address conversion table may be used to treat them as logically contiguous. This applies likewise below.

A final pointer is used to indicate the end of the region used by a location table. Records are stored in storage regions of fixed length termed "blocks". Blocks are comprised of primary blocks and overflow blocks. When a record cannot be added to the final primary block, a primary block is added subsequent to it and the record stored therein.

Links do not refer to physical linkage; this terminology is used (here and below) because the state in which a primary block maintains the address of a first overflow block and the first overflow block maintains the address of a second overflow block allows the blocks to be treated as though physically connected.

Being stored in this fashion, location table entries are in the order of their primary keys. Retrieval by primary key consists of finding a block by performing a binary search between the first address in the location table and the location table entry pointed to by the final pointer and finding the target record within that block. Any overflow blocks linked to that block are also subjected to the search.

While this description addresses retrieval, record updating, addition and deletion may also be implemented with like logic.

Alternate-key records (or alternate-key entries), each made up of an alternate-key value and a primary-key value, are stored in alternate-key blocks in the order of their alternate-key values.

When an alternate-key block is full and an alternate-key entry is added to that alternate-key block, an alternate-key overflow block is linked to the alternate-key block and the alternate-key entry stored therein. A further alternate-key overflow block may be linked to an alternate-key overflow block. Alternate-key location table records (or alternate-key location table entries) that contain the addresses of the alternate-key blocks are held in alternate-key location tables that occupy contiguous regions.

Alternate-key location tables are secured beforehand in contiguous regions.

An alternate-key final pointer is used to indicate the end of the region used by an alternate-key location table.

In the addition of an alternate-key entry, an alternate-key entry having an alternate-key value greater than the alternate-key values of existing alternate-key entries is stored in the last alternate-key block, and if it cannot be stored in that alternate-key block, a new alternate-key block is created and the record stored in that alternate-key block.

A set of alternate-key location tables and alternate-key blocks is termed an alternate-key table.

Alternate keys are non-unique keys in a database, examples of which in an employee database might include name and date of birth. Some databases need not use alternate keys, and others may use multiple alternate keys.

A method retrieving a record having a given alternate key is to perform a binary search between the first entry in the alternate-key location table and the alternate-key location table entry pointed to by the alternate-key final pointer, find the target alternate-key block, search within that alternate-key block and find the alternate-key entry having the target alternate key. Any alternate-key overflow blocks linked to that alternate-key block are also subjected to the search.

Next, a binary search is performed on the location table with the primary key of that alternate-key entry to find the target block and find the target record within that block. Any overflow blocks linked to that block are also subjected to the search.

Since alternate keys are non-unique keys, multiple records that have the same alternate-key value may exist. If so and the next alternate-key record in the alternate-key block has the same alternate-key value, the above operations are repeated.

While this description addresses retrieval, record updating, addition and deletion may also be implemented with like logic.

Where multiple alternate keys exist, alternate-key tables are created and used in the same quantity as that of the alternate keys.

In the Data Storage and Retrieval System thus characterized, it is possible to maximize hardware performance and achieve considerable high performance, but it cannot achieve any greater processing performance; in other words, it lacks scalability. This is also essentially true of other, conventional methods. However, since conventional methods are premised on the use of hard disks, although it is possible to achieve acceleration to speeds greater than those achieved with hard disks by employing high-speed memory devices such as semiconductors, the performance limit of those high-speed memory devices then constitutes the upper limit on their performance and so they do not essentially achieve scalability.

One technique in the prior art for the improvement of scalability is the load balancer. This consists of deploying multiple servers that appear to be a single server. At high levels of external processing requests, processing requests first go to the load balancer and scalability is achieved with the allocation by the load balancer of processing requests among the multiple servers thus alleviating the processing load per server. However, this approach suffers from a fatal shortcoming. This is that since multiple servers are capable of processing only the logic of the processing and since a database is a singularity and each server accesses the same database, database performance has been restricted by processing performance. In other words, ever if servers are added for increases in processing requests, database performance reaches an upper limit.

One method of achieving scalability in the Data Storage and Retrieval System is conceived in the achievement of a certain degree of scalability through, in the Data Backup and Recovery System (PCT/JP01/03126) of the inventor, the provision a secondary system that is a backup and copy of the primary system actually used for updating and referencing data and use of the secondary system for referencing data, in addition to its original purpose as a backup and recovery system.

Since the volume of update transactions is generally around one-tenth that of the volume of referencing transactions, this method makes it possible to alleviate the load on the primary system by using the secondary system for referencing. However, since the secondary system may not be used for updating, the scalability that may thus be achieved is limited.

Further, since a secondary system must be of the same configuration as the primary system and the location table, data-storage files (aggregations of blocks) and (zero, one or multiple) alternate-key tables deployed on it as a set, it has been a large financial burden to deploy multiple secondary systems for the purpose of achieving scalability in addition to the purpose of backup.

Another conventional method not entailing the Data Storage and Retrieval System that is in general use to improve performance is mirroring of servers that hold data, but since a mirror database must be of the same size as the original database, this has required large storage volumes and also entailed great restrictions on updating since a mirror database may basically be used only for referencing the data. It is restricted by the inability to reflect on a mirror server the updating occasioned by the modification of data on the main server without a certain temporal delay. This entails the danger that when data is updated on a mirror server, the outcome of updating may be rendered invalid due to the time lag with updating on the main server, and this method is one that cannot be adopted for regular data processing. Thus, performance improvement using mirror servers may not be employed in regular real-time data processing.

Thus, circumstances are such that the achievement scalability for databases is a significant problem, but an adequate solution does not exist. These circumstances arise from, in addition to the need to duplicate the data itself, the complexity of index structures in conventional methods that makes duplication troublesome when indices are updated.

There has been significant demand in the field of information processing for databases capable of achieving scalability in line with increases in processing volume. The present invention meets such demand.

SUMMARY OF THE INVENTION

The present invention is a database accelerator comprising a primary system holding data records that contain data elements including primary keys, primary blocks that store data records in the order of their primary keys and a location table that holds in a contiguous region location table entries containing the addresses of the primary blocks, and an accelerator system or systems holding a frond location table that holds in a contiguous region frond location table entries containing the addresses of the primary blocks.

The present invention is also a database accelerator comprising a primary system holding data records that contain data elements including primary keys and alternate keys, primary blocks that store data records in the order of their primary keys, alternate-key entries made up of alternate keys and primary keys, alternate-key blocks that include alternate-key entries and alternate-key location tables that hold in contiguous regions alternate-key location table entries, and an accelerator system or systems holding frond alternate-key location tables that hold in contiguous regions frond alternate-key location table entries.

An outline of the present invention is as follows. Consider the construction of a database system using the Data Storage and Retrieval System and retrieval by primary key (unique keys, existing one per record, whose key values are not duplicated in different records). Retrieval by primary key is performed with binary searches on the location table, and the number of accesses is as follows.

Given one billion data records, there will be fifty million blocks if an average of twenty records may be stored in a block. If there are no overflow blocks, the number of location table entries will be fifty million. Binary searches will be performed on this location table to retrieve object blocks, and the number of binary search iterations will be a log value with a base of 2. This gives a value of 25.6 iterations, which rounds up to within 26 iterations.

On the other hand, the expected value of searches for a record within a block, without using special methods and reading from the first record, is ten. If binary searching may be employed, the value is within five iterations.

In other words, this shows that in order to retrieve a given block it is necessary to perform 26 searches on the location table. Additionally, it is seen that accessing a location table entails a greater load in the retrieval of a record than does accessing a block.

This applies likewise to retrieval by alternate key. The recitation of the present invention assumes the use of alternate-key tables in a form that employs alternate-key location tables. Retrieval by alternate key is performed by performing binary searches on alternate-key location tables. Assume that alternate-key blocks maintain an average of fifty entries. The number of alternate-key blocks will be twenty million. In other words, the number of alternate-key table entries will be twenty million. Binary searches will be performed on these alternate-key tables. The number of binary search iterations will be 24.3, which rounds up to within 25 iterations.

Since alternate-key entries in alternate-key blocks may be of fixed length, retrieval of an alternate-key entry by means of a binary search will require up to six iterations.

In other words, the load on an alternate-key location table vastly exceeds the load on an alternate-key block.

The probability of accessing an identical block is also quite low. The reason is that, given an average transaction time of one one-hundredth of a second, ten thousand transactions processed per second and fifty instances of data updating per transaction, the following applies.

During the execution of a given transaction, an average of 100 other transactions will be executed. Thus, the number of records that will simultaneously updated at that point is 100× 50=5000.

On the other hand, since the total number of blocks is fifty million, the probability is extremely low that records stored in the same block would be used simultaneously, even assuming block exclusion.

This shows that the volume of data processed may be increased by deploying multiple location tables and alternate-key location tables, copying their most recent entries and alternate-key entries, increasing the number of paths permitting key retrieval and allocating a CPU to each path.

Herein, the server that maintains a database (a location table and blocks and alternate-key location tables and alternate-key blocks) and performs retrieval and updating is termed a primary system. FIG. 1 shows an example of a primary system. It is made up of one set of blocks that store data and a location table that manages the blocks and one set (an alternate-key table) of alternate-key blocks that store alternate-key entries and alternate-key location tables that manage the alternate-key blocks. One alternate-key table is created for each alternate key. Examples of alternate keys in an employee master database might include assignment, date of birth and date of employment. FIG. 1 shows an example in which three type alternate keys are used.

FIG. 2 shows an example of a primary system and an accelerator system. An accelerator system is one that, of the functionality of the primary system, maintains the location table and alternate-key location tables in whole or in part and that has the functionality of synchronizing these tables with the primary system and the functionality of using these tables to retrieve blocks in which records are stored. An accelerator system does not hold blocks, and the location table entries on an accelerator system hold the addresses of blocks on the primary system. Likewise, alternate-key location table entries on an accelerator system contain the addresses of alternate-key blocks on the primary system. In order to express the relationship between the primary system and the accelerator system concretely, this drawing shows lines pointing from the location table and alternate-key location tables on the accelerator system to blocks and alternate-key blocks on the primary system, but lines pointing from an accelerator system to the primary system are omitted in subsequent drawings in order to simplify the drawings.

Since it is essentially not at issue whether overflow blocks and alternate-key overflow blocks are present or not, these too are omitted here and in many subsequent drawings.

When the addition, update or deletion of data on the primary system results in the rewriting of data in blocks and this entails modification of the location table, the primary system transmits to the accelerator system the locations modified in the location table (the numbers of the location table entries) and the substance of those modifications, and the accelerator system updates those location table entries.

Likewise, when the addition, update or deletion of data on the primary system results in the rewriting of data in blocks and this entails modification of an alternate key, and when alternate-key entries in alternate-key blocks are rewritten and this entails updating of an alternate-key location table, the primary system transmits to the accelerator system the locations modified in the alternate-key location table (the numbers of the alternate-key location table entries) and the substance of those modifications, and the accelerator system updates those alternate-key location table entries.

Thus, the accelerator system maintains an up-to-date location table and alternate-key location tables.

FIG. 20 and FIG. 21 illustrate the relationship between processing servers (application servers) and the database server when the present invention is applied to actual information processing. FIG. 20 illustrates the use of a load balancer to distribute external processing requests among the processing servers. FIG. 21 illustrates the implementation of a processing request allocation system to connect application servers and a database server.

In FIG. 20 external processing requests are allocated to the application servers by the load balancer. Conventional methods entail the connection of a database server to the right of the application servers, but the present invention would connect either the primary system or an accelerator system to each application server.

To retrieve data on the basis of a processing request to the processing server 0, a request is sent to the primary system. When the request is a primary key, the primary system uses the location table to retrieve the target record. When the request is an alternate key, it uses the alternate-key location tables to retrieve the alternate-key entry and searches the location table on the basis of that alternate-key entry to retrieve the target record.

To retrieve data on the basis of a processing request to the processing server 1, a request is sent to the accelerator system 1. When the request is a primary key, the accelerator system uses the location table on the accelerator system 1 to find the target location table entry. The location table entry contains the address of the object block, but the accelerator system 1 lacks blocks. This is because blocks and records within blocks are referenced on the primary system.

When the retrieval is by alternate key, the alternate-key location tables of the accelerator system 1 are used to identify the target alternate-key location table entry. The address of the object alternate-key block is stored in the alternate-key location table entry. Since the accelerator system lacks alternate-key blocks, the alternate-key blocks on the primary system are searched. The alternate-key entry is retrieved, the location table on the accelerator system 1 searched on the basis of that alternate-key entry and the target location table entry retrieved. Next, the block and the record within the block on the primary system are identified.

Although the foregoing description pertains to the case of an accelerator system 1, where multiple accelerator systems are present, it applies entirely likewise to an accelerator system 2 and subsequent accelerator systems.

Although the example recited above describes the retrieval of data, it applies entirely likewise to the addition, updating and deletion of records. Operations through the retrieval of the location table entry on the basis of a data processing request to the accelerator system 1 are performed on the accelerator system 1, and the retrieval of the block and the record within the block, and then updating, addition or deletion, are subsequently performed on the primary system.

It is possible to disperse the load on a database by thus providing an accelerator system or systems and deploying duplicates of the location table and alternate-key location tables. And since an accelerator system does not maintain blocks or alternate-key blocks, it requires only one in several tens to one in several hundreds the data storage capacity of the primary system, and expansion of the system may be achieved at extremely low cost.

BRIEF DESCRIPTION OF THE DRAWINGS

The above and other objects of the present invention will become readily apparent by reference to the following detailed description when considered in conjunction with the accompanying drawings wherein:

FIG. 15 is an example of an asymmetrical accelerator system;

PREFERRED EMBODIMENTS OF THE INVENTION

The present invention is based on the concepts of the Data Storage and Retrieval System (Japanese Patent 3345628, U.S. Pat. Nos. 6,415,375 and 6,584,555) and has the objective of achieving scalability while using the basic elements thereof unmodified.

As a method of achieving scalability, the present invention deploys multiple location tables and alternate-key location tables of the inventions of the Data Storage and Retrieval System and the Database Reorganization System, and implements considerable increases in the overall processing volume by dispersing the load of binary searches performed on those.

Figure 1:
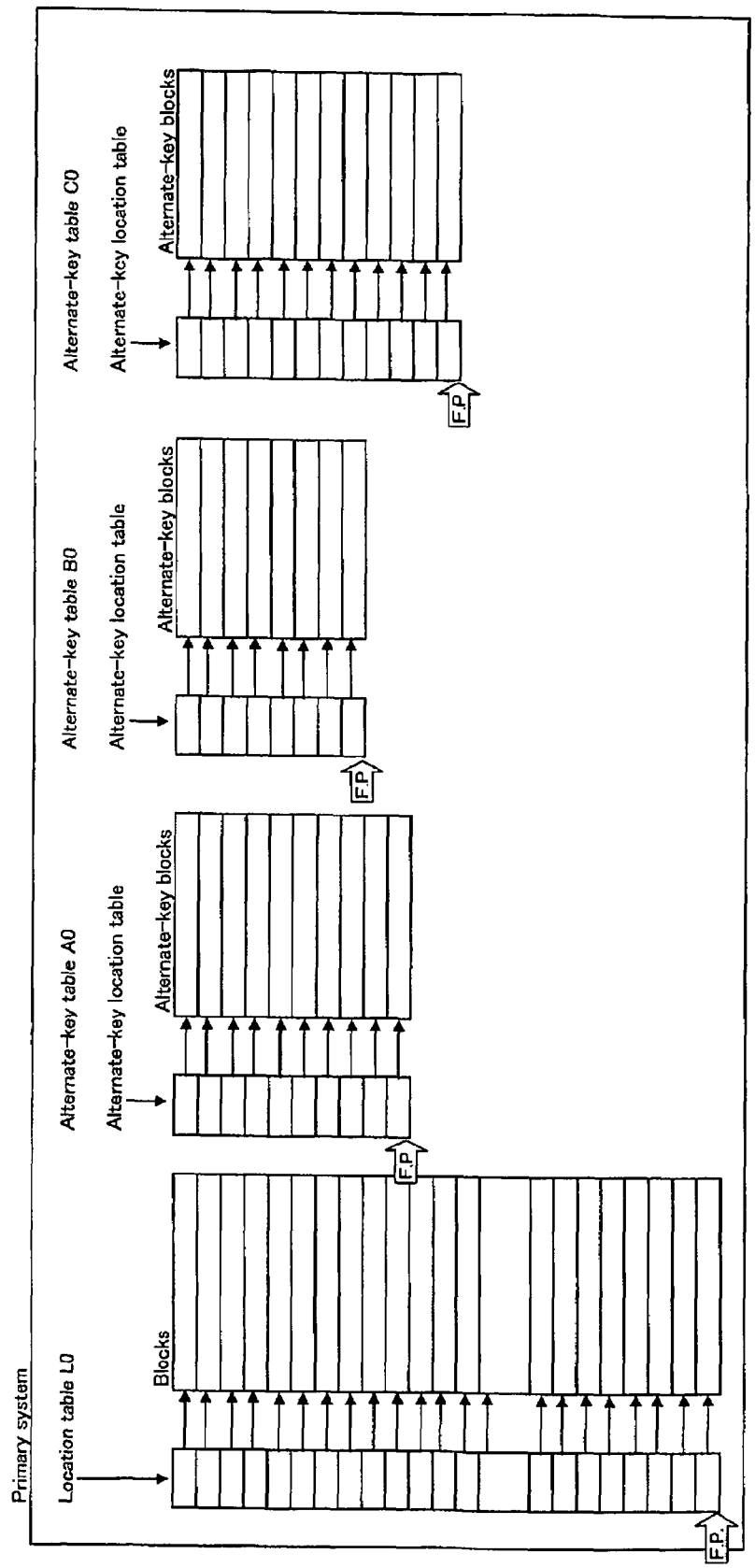
FIG. 1 is a typical example of a primary system.

A set of a location table and its blocks and alternate-key tables (one alternate-key location table and its alternate-key blocks for each alternate key) is termed a primary system. FIG. 1 is an example of a primary system. Three type alternate keys have been created here.

Figure 2:
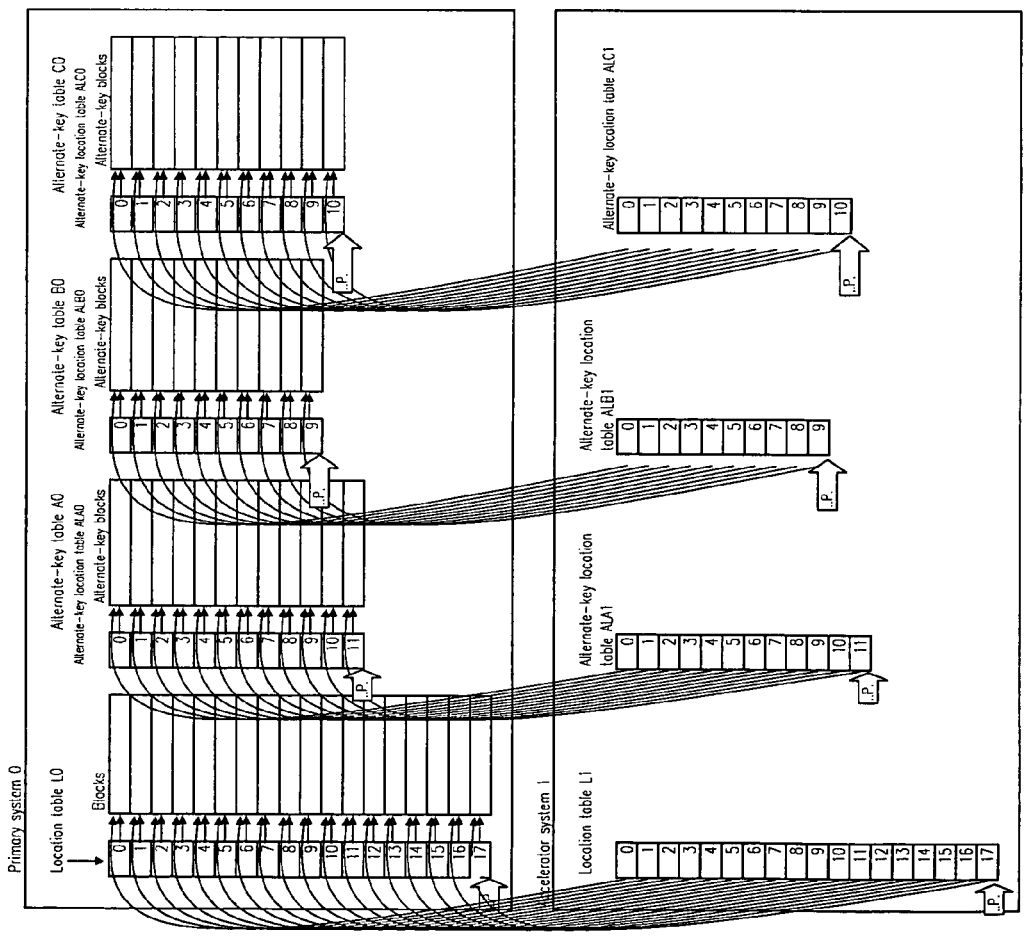
FIG. 2 is a typical example of a primary system and an accelerator system.

An accelerator or an accelerator system containing a location table and alternate-key location tables is termed. FIG. 2 is an example of an accelerator system. An accelerator system holds a location table (in places termed a frond location table in this specification in order to distinguish it from the location table on the primary system) identical to that on the primary system and alternate-key location tables (in places termed frond alternate-key location tables in this specification in order to distinguish them from the alternate-key location tables on the primary system) that are identical to any on the primary system. However, it does not hold blocks or alternate-key blocks. A frond location table should maintain the same entries as the location table on the primary system, and it must at a minimum maintain the block addresses or block numbers.

The description first addresses a configuration of a primary system and an accelerator system.

FIG. 2 is an example of a configuration of a primary system and an accelerator system. The frond location table L1 and frond alternate-key location tables ALA1, ALB1 and ALC1 of the accelerator system are each of a configuration, structure and content identical to the location table 0 and the alternate-key location tables ALA0, ALB0 and ALC0, respectively, of the primary system. In other words, the location table L1 of the accelerator system may be allocated to the location table L0 of the primary system. Likewise, the alternate-key location table ALA1 of the accelerator system may be allocated to the alternate-key location table ALA0 of the primary system. Likewise, ALB1 may be allocated to ALB0. Likewise, ALC1 may be allocated to ALC0. The primary system and accelerator system also contain a final pointer that indicates through which entry the location table is used and alternate-key final pointers that indicate through which entry the alternate-key location tables are used. These are the arrows labeled F.P. The final pointers are omitted from subsequent drawings in order to simplify the drawings.

An accelerator system may be implemented in software alone, or it may be implemented in combination with hardware.

Figure 3:
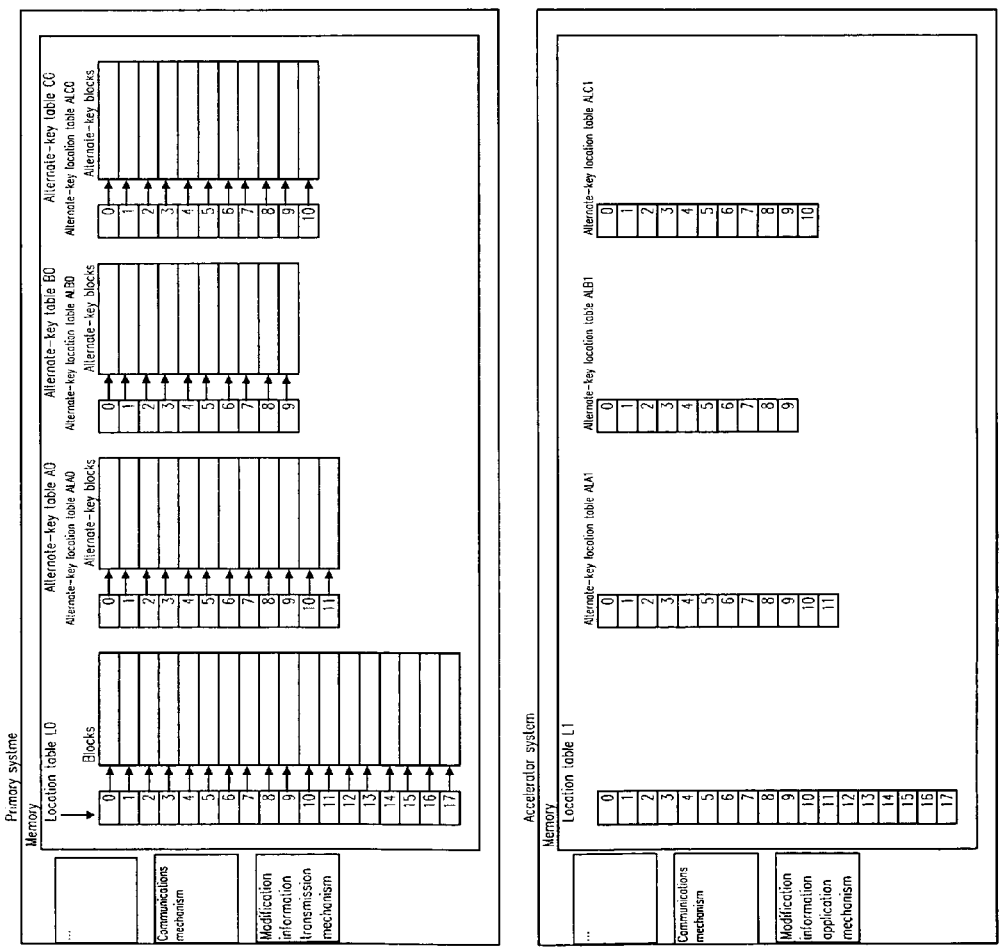
FIG. 3 illustrates a primary system and an accelerator system present on separate hardware systems.

FIG. 2 illustrates the basic elements of an accelerator system that is implemented as software. It may use the CPU, memory and other components equipped on the computer. The primary system and accelerator system may be implemented on the same hardware system or on separate hardware systems. FIG. 3 focuses on hardware. This drawing illustrates a primary system and an accelerator system present on separate hardware systems. In addition to a location table, blocks, alternate-key location tables and alternate-key blocks, the primary system is provided with a CPU, a communications mechanism and a modification information transmission mechanism. In addition to performing binary searches on the location table and alternate-key location tables, the CPU performs updating of the blocks and alternate-key block and updating of the location table and alternate-key location tables.

In addition to a frond location table and fond alternate-key location tables, the accelerator system is provided with a CPU, a communications mechanism and a modification information application mechanism. The CPU performs binary searches on the frond location table and frond alternate-key location tables.

The communications mechanism receives modification information from the primary system and, when the modification information has completed on the accelerator system, transmits information that application of the modification information has completed. The modification information application mechanism performs the necessary updating on the basis of modification information transmitted from the primary system. From the point of view of data volumes, the modification information should be in the form of difference information, but it may also be information that includes the entries affected.

Although this drawing shows a single CPU, multiple CPUs may also be deployed, one each assigned to a location table or alternate-key location table. The communications mechanism and modification information application mechanism may be implemented only as software and the CPU in the drawing function as the hardware, or each of those mechanisms may be provided as dedicated CPUs.

Although this specification describes the transmission and reception of information via the modification information transmission mechanism, the modification information application mechanism and the transmission mechanism, these may also be implemented by producing specialized hardware. Automatically rewriting at another address when information at a specified address is modified is a mechanism (a synchronous updating mechanism) for updating the frond location table and frond alternate-key location tables of an acceleration system when the location table and alternate-key location tables of the primary system are modified.

The primary system may employ a method of notification rather a method transmission.

Access on a Primary System

The description following primarily addresses methods, and these methods may be used to produce a system (program).

The main operations in access on a primary system are the same as operations when an accelerator system is not employed. The major difference when an accelerator system is present is that when either the location table or an alternate-key location table or both are modified on the primary system, that modification information is transmitted to the accelerator system and the frond location table and frond alternate-key location tables on the accelerator system are updated, in addition to the modifications on the primary system.

The Data Backup and Recovery System provides a synchronous, tightly-coupled method and an asynchronous, loosely-coupled method of reflecting on a secondary system modifications made to data stored on a primary system, and the present invention employs the synchronous, tightly-coupled method in the description of reflecting on an accelerator system modifications on a primary server. Although the synchronous, tightly-coupled method facilitates implementation, the present invention may also be implemented according to the generally known method of difference transmission. The synchronous, tightly-coupled method consists of, when a modification occurs on a primary system, transmitting modification to the backup secondary system and not proceeding to subsequent processing on the primary system until the secondary system completes those modifications. The secondary system is the backup system of the Data Backup and Recovery System and in the present invention may be applied inter alia as the accelerator system.

Reflecting the Modification of a Location Table on an Accelerator System

The description first addresses the application on the accelerator system 1 of updates to the location table L0 on the primary system 0. An update of the location table L0 consists of the updating of an entry in the location table L0. If the content of entry n of the location table L0 is thereby modified, the updated content of entry number n in the location table L0 is transmitted to the accelerator system. As explained above, the transmission is performed by means of a synchronous, tightly-coupled method. The type of transaction employed is an A log (post-update log). An identifier for the location table L0 is attached to indicate which file was updated. This identifier and this A log are those recited in the invention of the Data Backup and Recovery System.

Updating may entail the addition of an entry in addition to updating of content.

Where this applies, entries through m are in use and m+1 is then used. Thus, the content of entry m+1 may be treated in entirely like fashion as an update. In other words, the updated content of entry m+1 in the location table L0 on the primary system 0 is transmitted, together with the number of the entry, to the accelerator system 1 via the communications mechanism from the modification information transmission mechanism. The accelerator system receives the information via the communications mechanism and updates the frond alternate-key location table affected by means of the modification information application mechanism. However, since the final pointer is also updated in this case, the content of the final pointer must, like the entry, also be transmitted to the accelerator system 1.

The recitation next addresses the creation of an entirely new location table, when all of the location table created beforehand has been used up, and the creation of entries in that new location table.

Assume here a number k of entries in the first location table created. Although it is possible to add one entry as new additional location table to current location table, this entails poor efficiency and so a rather substantial location table should be created in a contiguous region. The recitation thus addresses the addition of a location table to hold h entries, from k+1 to k+h.

This consists of first creating in a contiguous region a location table having a region that will hold h entries. The leading address and the final address of the h entries are determined. An identifier indicating both those addresses and the addition of a location table is transmitted from the primary system 0 to the accelerator system 1 via the communications mechanism from the modification information transmission mechanism. On the basis of this transaction, a frond location table L1 is created and added on the accelerator system 1. Next, the k+1 entry is updated in the location table L0 on the primary system 0. The reason why is that it was not possible to store the kth entry and so an additional location table was added.

The A log for k+1 is then transmitted from the primary system 0 to the accelerator system 1 via the communications mechanism from the modification information transmission mechanism. The transmission of this A log and the updating of the accelerator system 1 on the basis of the A log are handled in like fashion as for regular updates.

Since transmission is by a synchronous, tightly-coupled method, exclusion is not lifted on the primary system until updating on the accelerator system 1 has completed, and where the processing of new transactions entails placing the same block under exclusion, these operations then wait for exclusion to be lifted.

The addition of an overflow block to a primary block occasioned by the insertion of a record is as follows.

This is in no way problematic when the primary-key values of the records stored in that block do not maintain both the high and low values. Since entries in the location table L0 are not modified, there is no need to transmit information from the primary system 0 to the accelerator system 1.

Where both or either one of the high and low values of primary-key values are maintained in the location table L0, there is likewise no need to transmit information from the primary system 0 to the accelerator system 1 unless either the low value or the high value is modified.

Where both or either one of the high and low values of primary-key values are maintained in the location table L0 and either the low value or the high value is modified, entry information will then be modified and the updated content of that entry in the location table L0 of the primary system 0, together with the number of the entry, is transmitted to the accelerator system 1 via the communications mechanism from the modification information transmission mechanism. The information is received on the accelerator system via the communications mechanism and the affected frond location table entry placed under exclusion and then updated. Exclusion is then lifted and modification information application transmitted to the primary system.

Reflecting Updates to Alternate-Key Table Entries on an Accelerator System

The recitation next addresses the updating of alternate-key tables. An alternate-key table is comprised of an alternate-key location table, alternate-key primary blocks and alternate-key overflow blocks. Alternate-key overflow blocks are subordinate to alternate-key primary blocks, and it is alternate-key primary blocks alone that are managed by alternate-key location tables.

Figure 6:
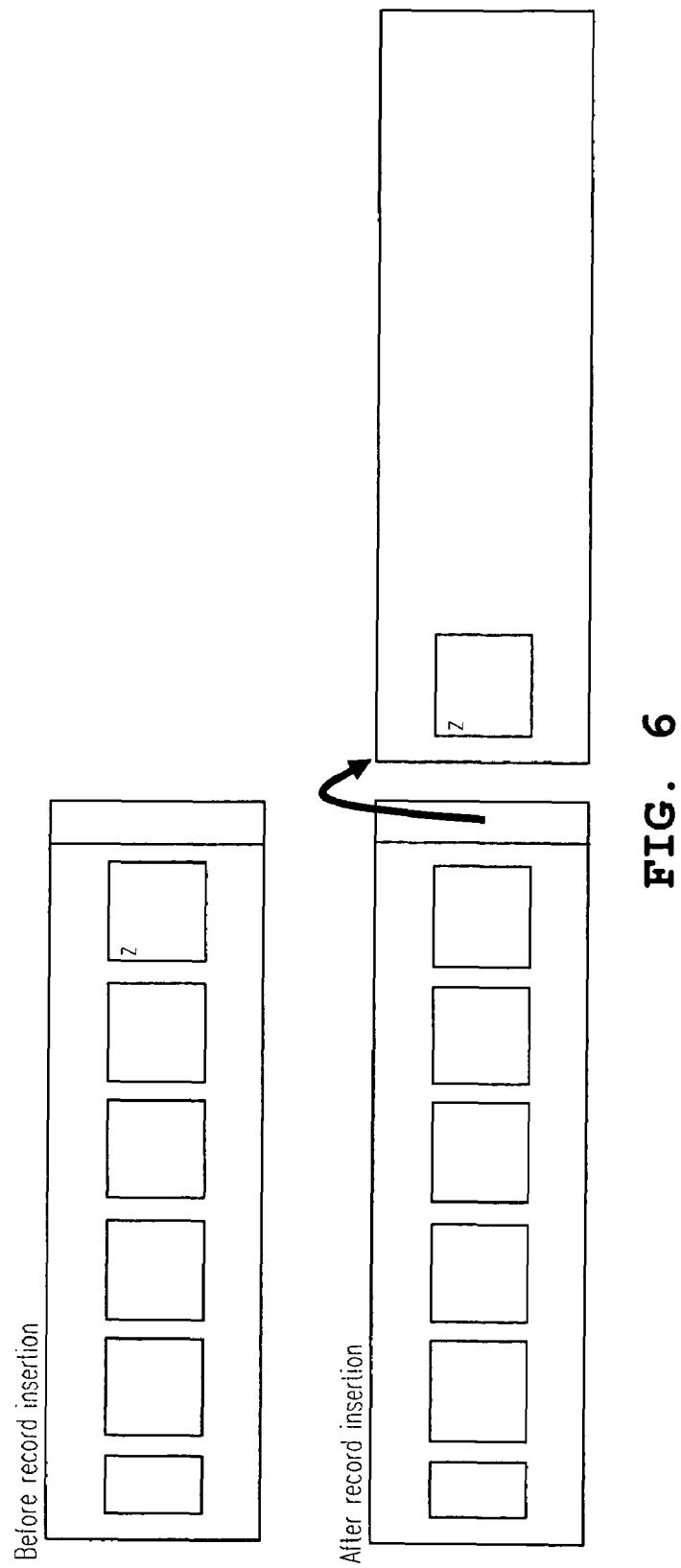
FIG. 6 is an example of the generation of an overflow block in an example of the state of a block when adding (inserting) a record on a primary system.

The recitation first addresses the addition of an alternate-key entry. Entries such as those illustrated in FIG. 6 are stored in alternate-key primary blocks. When an entry y is added immediately subsequent to an entry x in an alternate-key primary block, the content of the alternate-key primary block is updated, but since there is no modification of the high value or the low value of that alternate-key primary block and neither is there an addition of an alternate-key overflow block, there is no updating of the alternate-key location table. Therefore, there is no transmission of update information from the primary system 0 to the accelerator system 1.

The recitation next addresses the creation of an alternate-key overflow block resulting from the insertion of an entry at a state in which alternate-key primary blocks alone had existed. The recitation makes reference to FIG. 6. The task here was to store an alternate-key entry y in a target alternate-key primary block p on the primary system, but the alternate-key primary block p lacks sufficient space to store the entry. It is necessary to add an alternate-key overflow block on the primary system. This consists of finding space to create the alternate-key overflow block in the data storage area and acquiring that region. Alternate-key overflow blocks are of a uniform size that varies with the alternate key.

The new alternate-key entry y is then stored in the alternate-key primary block on the primary system where an alternate-key entry z had been, and the alternate-key entry z is consequently stored in the alternate-key overflow block. Of the high and low alternate-key values of the alternate-key primary block, the high value is now y and therefore the high-value data is rewritten to y. Additionally, the low and high alternate-key values of the alternate-key overflow block become z.

Again, since there is no modification of an entry in the alternate-key location table, there is no transmission of update information from the primary system 0 to the accelerator system 1.

Figure 8:
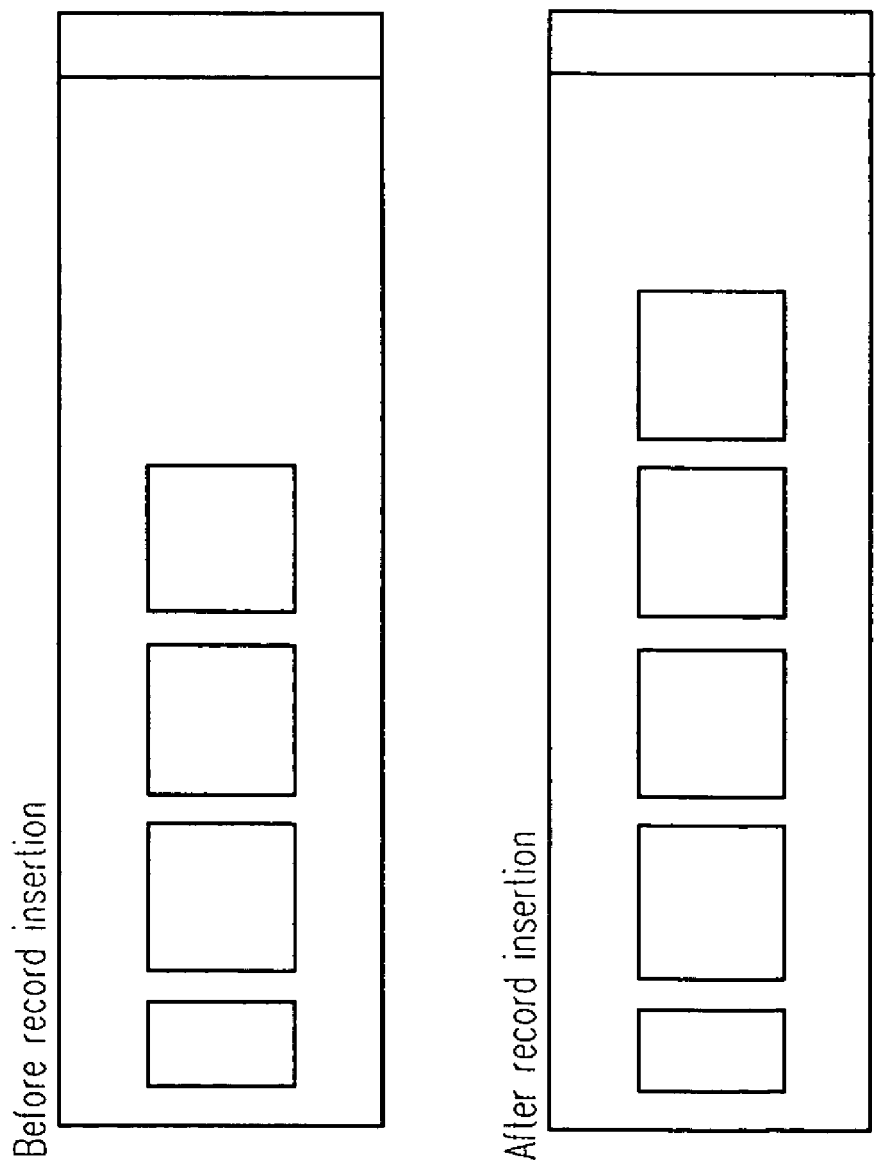
FIG. 8 illustrates the modification of the high primary-key value in a block when a record in added (inserted) on a primary system.

The recitation next addresses the updating of an entry in an alternate-key location table. As shown in FIG. 8, alternate-key entries x and y are stored at the end of an alternate-key primary block before updating. When a new alternate-key entry z is added due to the updating or addition of data, the alternate-key entry z is added after y in that alternate-key primary block.

This results here in an update of the high alternate-key value of the alternate-key primary block p from y to z. In this case, an A log transmission is made from the primary system 0 to the accelerator system 1 of the updated value of the alternate-key entry and information on which alternate-key block was updated, which here is alternate-key block number p.

Once the A log is received on the accelerator system 1, the modification information application mechanism immediately places that entry in the alternate-key location table under exclusion, updates that alternate-key entry and then lifts exclusion and transmits to the primary system 0 that the update has been completed.

Retrieval by Primary Key on a Primary System

Retrieval by primary key on the primary system 0 is as recited in the invention of the Data Storage and Retrieval System.

Retrieval consists of performing a binary search on the location table L0 of the primary system 0 between the leading address in L0 and the location table entry pointed to by the final pointer of L0 and retrieving the location table entry that contains the target key value. In order to simplify the description, the recitation below may simply refer to the performance of a binary search on the location table, but what this in fact means is to perform a binary search between the leading address in the location table and the location table entry pointed to by the final pointer of the location table.

If the location table entry maintains both or either one of the low and high primary-key value of the block managed by that entry, the target key value is compared with that low value or high value. If the location table entry does not maintain either the low or high primary-key value, it is compared with both or either one of the low and high primary-key values in the block. If it maintains only one of either the low and high primary-key values, it must be compared with the adjacent location table entries or with the block. In this way, the block containing the record holding the target key value is retrieved. A record containing that target-key value may exist in that block or may not exist in that block.

Since retrieval does not entail any updating of records, the location table is not updated and there is no transmission of information from the primary system to an accelerator system. Nor, in principle, is exclusion required.

Retrieval by Alternate Key on a Primary System

Retrieval by alternate key on the primary system 0 is as recited in the invention of the Data Storage and Retrieval System.

Retrieval is performed according to the target key value (the value of the key that is the object of retrieval). In this case, assume retrieval from alternate key A0. Retrieval consists of performing a binary search on the alternate-key location table ALA0 on the primary system 0 between the leading address in ALA0 and the alternate-key location table entry pointed to by the alternate-key final pointer in ALA0 and retrieving the alternate-key location table entry that contains the target key value. In order to simplify the description, the recitation below may simply refer to the performance of a binary search on an alternate-key location table, but what this in fact means is to perform a binary search between the leading address in the alternate-key location table and the alternate-key location table entry pointed to by the alternate-key final pointer of the alternate-key location table.

A search is then performed within the alternate-key block pointed to by that alternate-key location table entry and the target alternate-key entry found. If an alternate-key overflow block is linked to that alternate-key block, any such alternate-key overflow block is also made subject to the search.

Assume that the alternate-key entry retrieved pointed to alternate-key block number n. If an alternate-key entry having the target key value exists in alternate-key block n on the primary system 0, that alternate-key entry is the target entry. If an alternate-key entry having the target key value does not exist in block n, this means that no records exist having that target key value.

In order to retrieve a target record, it is necessary to find the block in the location table L0 that contains the target record.

If the alternate-key entry maintains the block number, the product of the length of entries in the location table L0 multiplied by the block number is its offset from the top of the location table L0. This means that the target record is stored in the block pointed to by the location table entry retrieved. The record having the primary-key value indicated by the alternate-key entry found from the search is retrieved from within the block. In this case, conditions will not arise in which a record is not found.

To retrieve the record having the primary-key value indicated by the alternate-key entry found from the search given a format in which neither the block number nor the block address is maintained, a binary search is performed on the location table L0 of the primary system with that primary-key value as the target key and the location table entry retrieved. On the basis of the block number thus found, the objective record is retrieved from within the blocks on the primary system. Since retrieval does not entail any updating of records, the location table is not updated and there is no transmission of information from the primary system to an accelerator system. Nor, in principle, is exclusion required.

Since an alternate-key is a non-unique key, multiple records may exist that have the same alternate-key value, in which case the above operations are repeated.

Addition, Updating and Deletion of Records on a Primary System

The foregoing recitation addresses retrieval by primary key and by alternate key. The addition, updating and deletion of records may be performed by applying methods that employ retrieval.

Addition of Records on a Primary System

Figure 4:
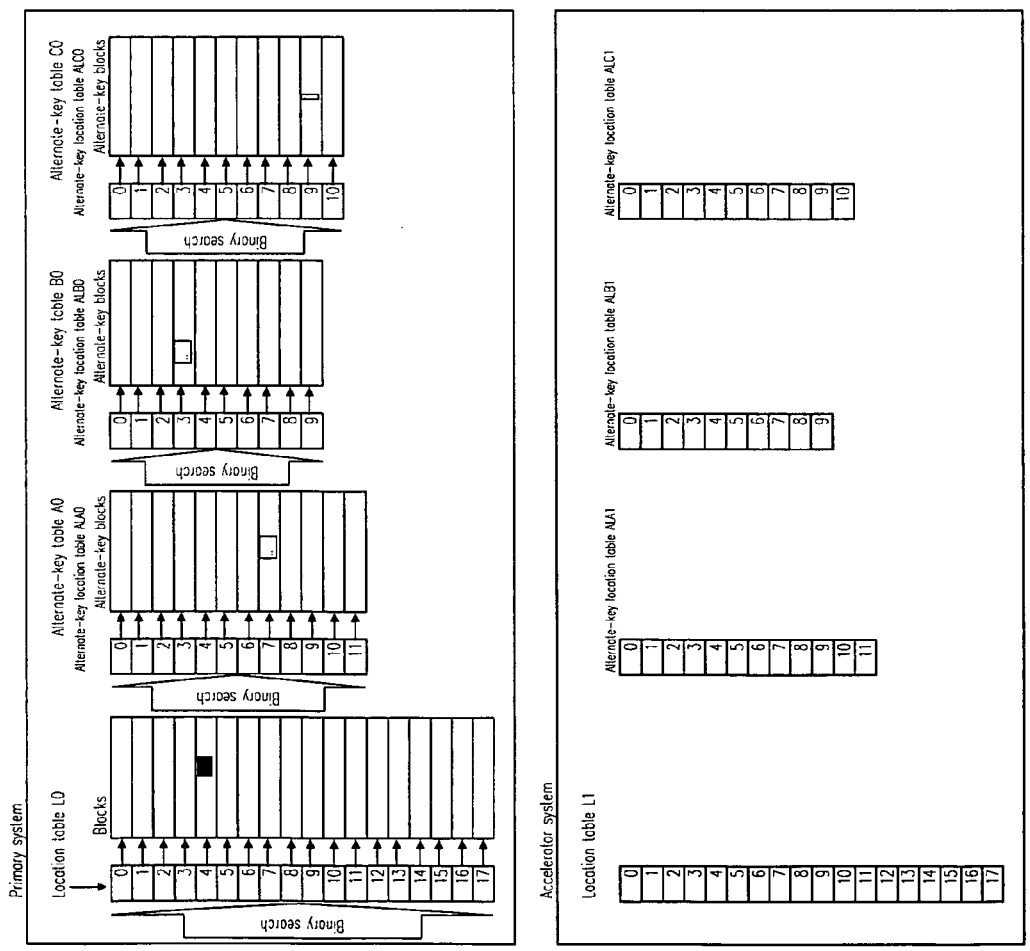
FIG. 4 is an example of the addition of a record on a primary system.

The recitation addresses first the addition of records, with reference to FIG. 4.

To add a record, it is necessary to find out which block that record will be stored in.

Doing so on the primary system 0 consists of performing a binary search on the location table L0 and retrieving the location table entry where the added record should be stored.

Assume that the entry retrieved indicates block number n.

Searching on records within a block consists of searching in block n on the primary system 0. Since the processing request here is for updating, the following operations are performed after placing the affected entry in the location table L0 on the primary system 0 and the block that that entry indicates under exclusion. The method of writing exclusion information to location table entries and blocks of the invention of the Database Reorganization System and Database is preferred for its acceleration.

Figure 5:
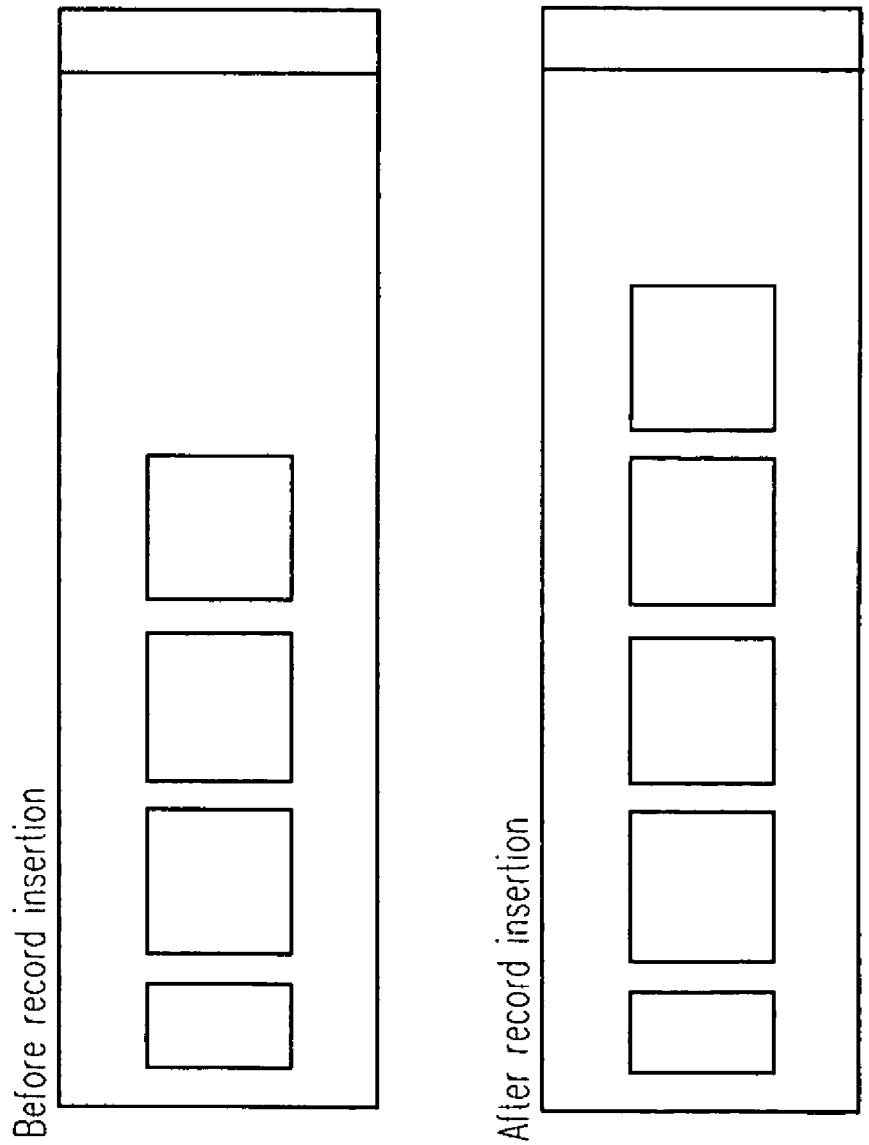
FIG. 5 is an example of the state of a block when adding (inserting) a record on a primary system.

The records in block n are examined and the record found that has the highest primary-key value of those primary-key values less than the target key value. The record will be inserted at the address subsequent to that record. In order to insert the record, records having higher-order addresses than the record inserted must be shifted in the higher-order direction by the amount of space that the inserted record will occupy. And when an overflow block results from shifting in the higher-order direction, an overflow block is added and records moved. The insertion of the record is performed thereafter. The black rectangle in block number 4 in FIG. 4 represents the record added. It is stored here in the block of block number 4. FIG. 5 illustrates the circumstances of record insertion in more concrete fashion. The example shown here is of the insertion of a record y between a record x and a record z. FIG. 6 shows the generation of an overflow block resulting from the insertion of a record. As in FIG. 5, the high primary-key value in the block is not modified here.

When a record is inserted, the location table L0 is not modified. The addition of a record results in the modification of the location table when the location table entries contain the high primary-key values and the primary-key value of the record added becomes the high primary-key value in that block. In this case, the information in that location table entry in the location table is updated. Consequently, the update information for that location table entry is transmitted from the primary system to the accelerator system 1 via the communications mechanism from the modification information transmission mechanism. On the accelerator system, it is received via the communications mechanism and that frond location table entry is updated by the modification information application mechanism. FIG. 4 shows a case in which there is no modification of a location table entry.

Since transmission is by a synchronous, tightly-coupled method, exclusion is not lifted on the primary system until updating on the accelerator system 1 has completed, and where the processing of new transactions entails placing the same block under exclusion, these operations then wait for exclusion to be lifted.

Addition of Alternate-Key Entries Resulting from Record Addition on a Primary System The addition of a record may result in the addition of an alternate-key entry. Although not required for a primary system on which alternate keys are not used, the recitation here addresses an instance of the use of three type alternate keys (A, B and C).

Given three type alternate keys, the addition of a record may result in the addition of alternate-key entries for three different alternate keys. Operations are all the more simple where alternate-key entries are not created, as with unregistered keys, because there is no addition of alternate-key entries. Their description is therefore omitted here.

Three alternate-key entries Ae, Be and Ce are created. These must be stored in alternate-key tables A, B and C, respectively. The recitation addresses the case of alternate-key table A0. A binary search is performed with the alternate-key value of e in the alternate-key location table ALA0 as the target key value. This results in retrieval of the alternate-key block in which the alternate-key entry should be stored.

Since the exclusion sequence here is, as recited in the invention of the Database Reorganization System, a uniform exclusion sequence of the location table, then blocks, then the alternate-key location table and then alternate-key blocks, the possibility of deadlock is extremely low. This may be applied to the remaining whole of the recitation.

This entailing the insertion of Ae in the alternate-key block, the alternate-key entries in the object alternate-key block are examined. Since alternate keys are non-unique keys, multiple entries that have the same alternate-key value may exist.

The recitation addresses first a case in which alternate-key entries exist that have an alternate-key value identical to the target key value. In this case, the primary key of the object alternate-key entry added is noted and, of those alternate-key entries that have the same alternate-key value, the alternate-key entry is inserted at the address subsequent to that alternate-key entry that has the greatest primary-key value among those having a primary-key value less than the primary-key value of the object alternate-key value added. The alternate-key entry is inserted. Alternate-key entries with higher-order addresses than the alternate-key entry inserted are shifted in the higher-order direction by the amount of space that the object alternate-key entry added will occupy. When shifting in the higher-order direction results in the generation of an alternate-key overflow block, an alternate-key overflow block is added and alternate-key entries moved. The addition of the alternate-key entry is performed thereafter.

Figure 19:
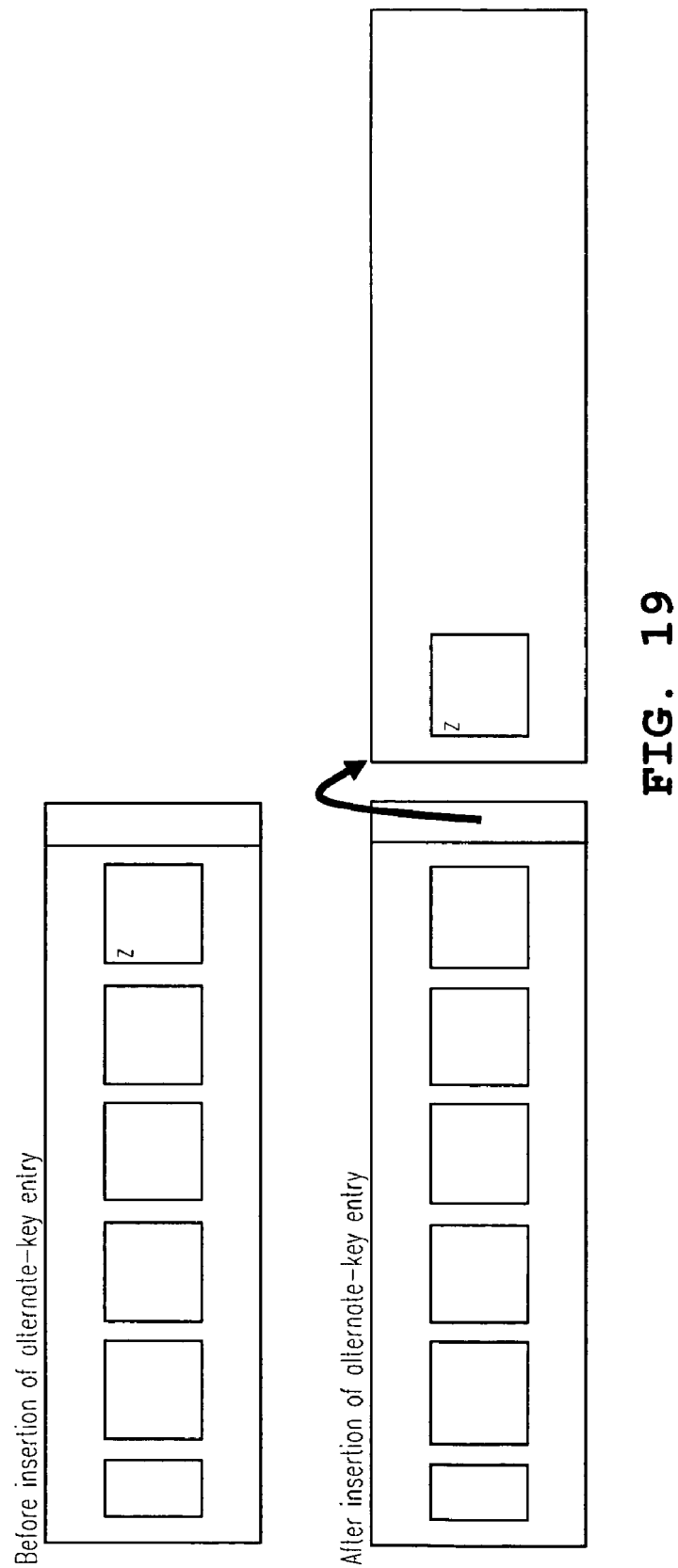
FIG. 19 is an example of a state in which an alternate-key entry has been added and an alternate-key overflow block generated.

The recitation addresses next a case in which no alternate-key entries exist that have an alternate-key value that is the same as the target key value. In this case, the alternate-key entry is inserted at the address subsequent to the alternate-key entry having the greatest alternate-key value among those alternate-key entries having alternate-key values in the object block that have primary-key values less than the alternate-key value of the object alternate-key entry added. In order to insert the alternate-key entry, the alternate-key entries with higher-level addresses than the alternate-key entry inserted are shifted in the higher-order direction by the amount of space that the object alternate-key entry added will occupy. When shifting in the higher-order direction results in the generation of an alternate-key overflow block, an alternate-key overflow block is added and alternate-key entries moved. The addition of the alternate-key entry is performed thereafter. FIG. 19 is an example of the addition of an alternate-key entry resulting in the generation of an alternate-key overflow block but the low value and high value remaining unaffected.

Figure 18:
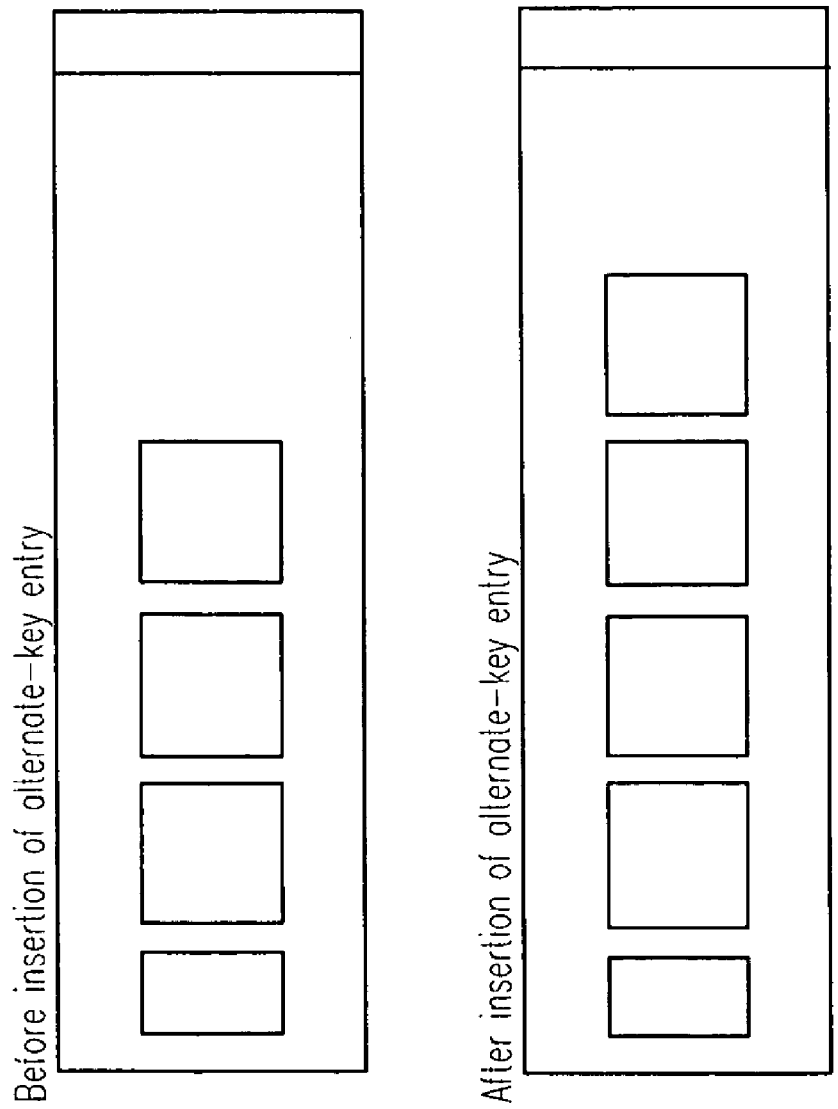
FIG. 18 is an example of a state in which an alternate-key entry has been added.

The addition of an alternate-key entry results in modification of an alternate-key location table when the alternate-key location table entries contain the high alternate-key values and the alternate-key value inserted becomes the high key value in that alternate-key block. If so, the information in that alternate-key location table entry in the alternate-key location table is updated. FIG. 18 is an example of a modification of the high value in an alternate-key block resulting from the addition of an alternate-key entry.

Consequently, update information for that alternate-key location table entry is transmitted from the primary system 0 to the accelerator system 1 via the communications mechanism from the modification information transmission mechanism. On the accelerator system, it is received via the communications mechanism and the modification information application mechanism places the affected frond alternate-key location table entry under exclusion, performs the modification and then lifts exclusion. Modification information application completion information is then transmitted to the primary system.

Addition of alternate-key entries is performed likewise for alternate-key tables B and C. FIG. 4 illustrates Ae stored in block number 7 of the alternate-key blocks, Be stored in alternate-key block number 3 and Ce stored in alternate-key block number 9. Here there has been no modification of an alternate-key location table.

Figure 7:
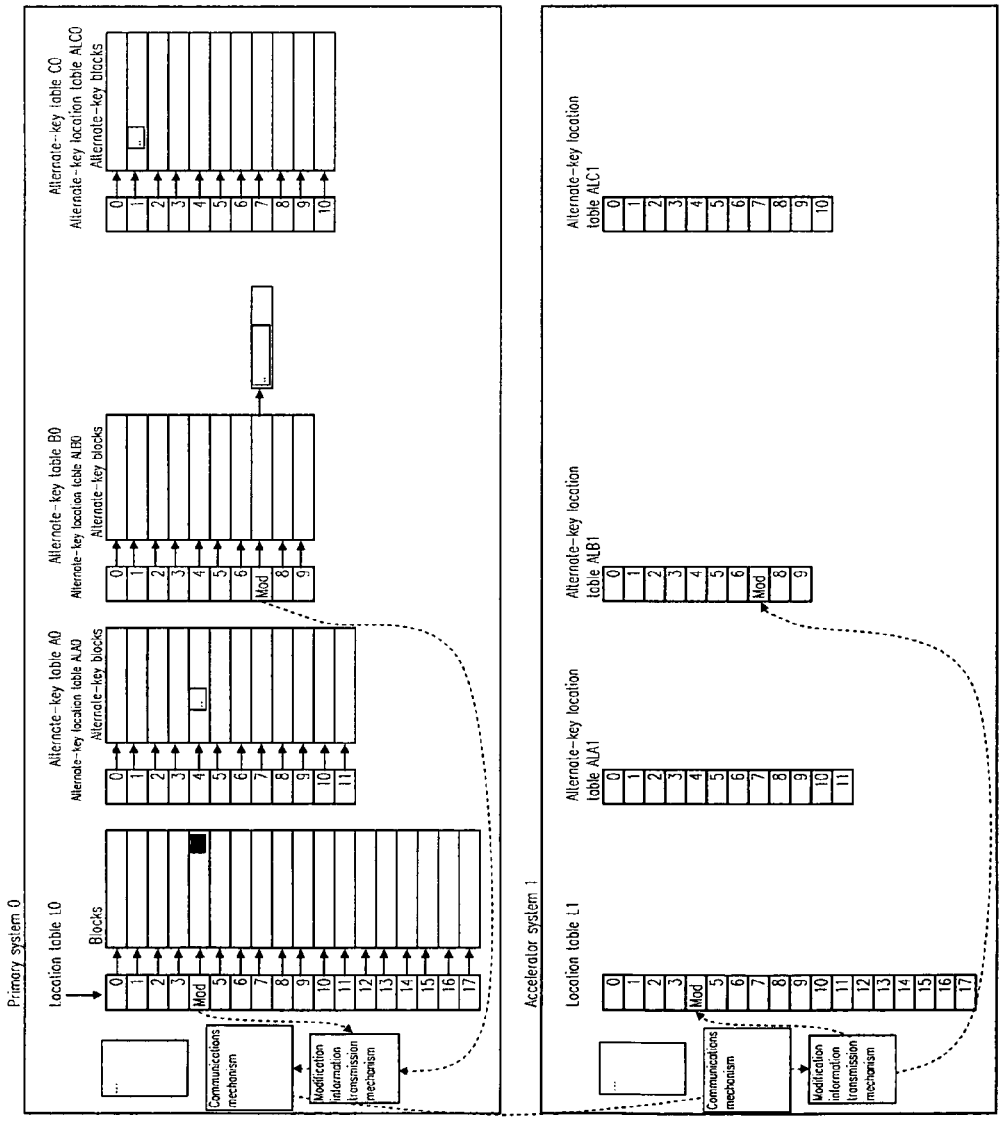
FIG. 7 is an example of the addition (insertion) of a record on a primary system. It illustrates the modification of the high primary-key value of the block 4 to which the record is added, the addition of an alternate-key overflow block to the alternate-key block 7 of alternate-key B and the modification of the high alternate-key value of that alternate-key block.

Next, FIG. 7 illustrates the modification of the location table and also of an alternate-key location table ALB0 resulting from the insertion of a record. Here the insertion of the record resulted in the modification of the high primary-key value of the records in the block. FIG. 8 illustrates the insertion of a record in concrete fashion. Here a record x has been inserted subsequent to a record x and a record y, and the high primary-key value of the records in that block is modified. This results in the modification of location table entry 4 in L0 of the primary system. This modification information is transmitted to the location table L1 of the accelerator system. Location table entry 4 in the location table L1 is modified with the modification information on the accelerator system 1. There is no modification of the alternate-key location table ALA0. The addition of Be resulted in modification of alternate-key location table entry 7 in the alternate-key location table ALB0. Entry 7 in ALB0 is modified on the primary system, and that modification information transmitted to the accelerator system 1 via the communications mechanism from the modification information transmission mechanism. On the accelerator system 1 it is received via the communications system, and the modification information application mechanism modifies entry 7 in ALB0. There is no modification of the alternate-key location table ALC0. When modification of a location table or alternate-key location table is performed on an accelerator system, exclusion is imposed before modification.

Once the addition of the alternate-key entries to the alternate-key tables A, B and C has completed, the exclusion imposed is lifted.

Updating Records by Primary Key on a Primary System
Updating consists of finding a target record by the same means as for retrieval by primary key and updating that record. When an update is performed, the block is placed under exclusion. When a primary-key value is updated, it is not handled as the update of a record, but the deletion and addition of a record. This method is one that has been employed in conventional databases.

A binary search is performed on the location table L0, and the location table entry retrieved that has the primary-key value of the record updated.

Assume that the entry retrieved points to block number n. The block exists on the primary system 0, which is therefore accessed.

The records in block n are examined, and the record identified that has the same primary-key value as the target key value. This is the record that will be updated. If no record having the target key value exists within the block, this means that no such record exists.

Records are updated in this way, but since the updating of primary-key values is not permitted, the location table L0 is not modified. The method employed to update a primary-key value is to delete the record with that primary-key value and then add a record with a new primary-key value.

Addition and Deletion of Alternate-Key Entries Resulting from Updating Records by Primary Key on a Primary System Updating a record may occasion updating of an alternate-key entry, which in fact consists of addition and deletion. Although unnecessary where alternate keys are not used on a primary system, the recitation here addresses an instance of the existence of three type alternate keys (A, B and C). Not every record update entails updating an alternate-key entry, but an alternate-key entry must be updated when a data item (field) in a record that is specified by an alternate-key is updated.

Where three type alternate keys are present, the update of a record may result in the update of from zero to three alternate-key entries. Operations are all the more simple where alternate-key entries are not created, as with unregistered keys, because there is no addition of alternate-key entries. Their description is therefore omitted here.

The example described here is one in which entries are updated for all alternate keys. The three new alternate-key entries Aen, Ben and Cen are created, and their alternate-key entries must be added. On the other hand, the alternate-key entries Aeo, Beo and Ceo previously in the record are no longer required and must be deleted.

Each of the three alternate-key entries Aen, Ben and Cen must be stored in the alternate-key tables A, B and C, respectively. The recitation addresses the case of the alternate-key table A0. A binary search is performed on the alternate-key location table AL0 with the alternate-key value of Aen as the target key.

Subsequent operations are likewise to those for the addition of a record resulting in the addition of an alternate-key entry and so are omitted here. Operations for Ben and Cen are also likewise to those for Aen and so are also omitted here.

Next, the alternate-key entries Aeo, Beo and Ceo must be deleted from the alternate-key tables A, B and C, respectively. As stated above, the description here is with respect to Aeo. The alternate-key location table AL0 is used to perform a binary search with the alternate-key value in Aeo as the target key.

This entails the deletion of Aeo, which entails the identification of the alternate-key entry whose alternate-key value matches its primary-key entry since, because alternate keys are non-unique keys, multiple alternate-key entries may exist that have the same alternate-key value.

Next the alternate-key entry is deleted that has a same alternate-key value and the same primary-key value as the target key value. When an alternate-key entry is deleted, the space occupied by the deleted alternate-key entry opens up.

Alternate-key entries at higher-order addresses than the alternate-key entry deleted are shifted in lower-order direction by the amount of space occupied by the object alternate-key entry deleted.

This addition and deletion of alternate-key entries results in the modification of an alternate-key location table when the alternate-key location table entries hold high alternate-key values and the alternate-key value added becomes the high key value in that block or when the alternate-key location table entries hold low alternate-key values and the alternate-key value deleted becomes the low value in that block or when the alternate-key location table entries hold the high alternate-key values and the alternate-key value deleted is the high key value in that block. If so, the information of that alternate-key location table entry of the alternate-key location table is updated.

Consequently, the update information for that alternate-key location table entry is transmitted from the primary system 0 to the accelerator system 1.

This addition and deletion of alternate-key entries is performed likewise for the alternate-key tables B and C.

Once the addition and deletion of alternate-key entries has completed for the alternate-key tables A, B and C, the exclusion imposed is lifted.

Updating Records by Alternate Key on a Primary System

Updating consists of finding a target record with the same method as used for retrieval by alternate key and updating that record. Since alternate keys are non-unique, multiple records may exist that have the same alternate-key value, and if so, records with the same key value are updated. Updating entails placing blocks under exclusion. When an alternate-key value is updated, its alternate-key table will be modified, which entails the deletion of the old alternate-key entry and the addition of a new alternate-key entry.

When the addition and deletion of alternate-key entries results in the modification of an alternate-key location table entry, modification information is transmitted from the primary system to an accelerator system.

Deletion of Alternate-Key Entries Resulting from Deletion of Records by Primary Key on a Primary System When a record is deleted, an alternate-key entry must consequently be deleted. Although unnecessary where alternate keys are not used on a primary system, the recitation here addresses an instance of the existence of three type alternate keys (A, B and C). The deletion of a record necessarily requires the updating of an alternate-key entry.

Given the use of three type alternate keys, the deletion of a record may result in the deletion of three alternate-key entries.

The alternate-key entries Ae, Be and Ce employed above are the objects of deletion. If an alternate-key location table entry is modified, modification information is transmitted from the primary system to the accelerator system.

Deletion of Records by Alternate Key on a Primary System

A binary search is performed on the alternate-key location table AL0 to retrieve the alternate-key location table entry having the alternate-key of the record deleted.

After retrieving the alternate-key location table entry, a search is performed within the alternate-key blocks to find the alternate-key entry. Once the alternate-key entry is retrieved, a search is performed on the block storing the record.

These operations are the same as those recited for the retrieval of records by alternate key.

Since alternate keys are non-unique keys, record retrieval by alternate key may return multiple records. The execution of deletion by alternate key consists of sequentially reading records having the same alternate-key value and selecting whether or not to delete each one according to its primary key and data content. Here multiple records are deleted sequentially.

The management of empty space within blocks and the deletion of alternate-key entries resulting from the deletion of records is likewise to the deletion of records by primary key. Modification information for that portion of location table entries and alternate-key location table entries that undergo modification is transmitted from the primary system to the accelerator system.

Access on an Accelerator System

Next, the recitation addresses operations on an accelerator system occasioned by the retrieval, addition, updating and deletion of data, operations thus occasioned on the primary system and operations on an accelerator system further occasioned by those operations on the primary system. These are basically similar to operations on the primary system. However, since blocks and alternate-key blocks do not exist on an accelerator system, these are accessed on the primary system and the greatest difference is that the primary system and accelerator system operate in conjunction with each other. That when modifications occur to the location table or an alternate-key location table on the primary system, modification information is transmitted from the primary system to the accelerator system and the accelerator system updates its location table and alternate-key location tables is likewise to access on a primary system.

Deletion by Primary Key on the Accelerator System 1

Figure 9:
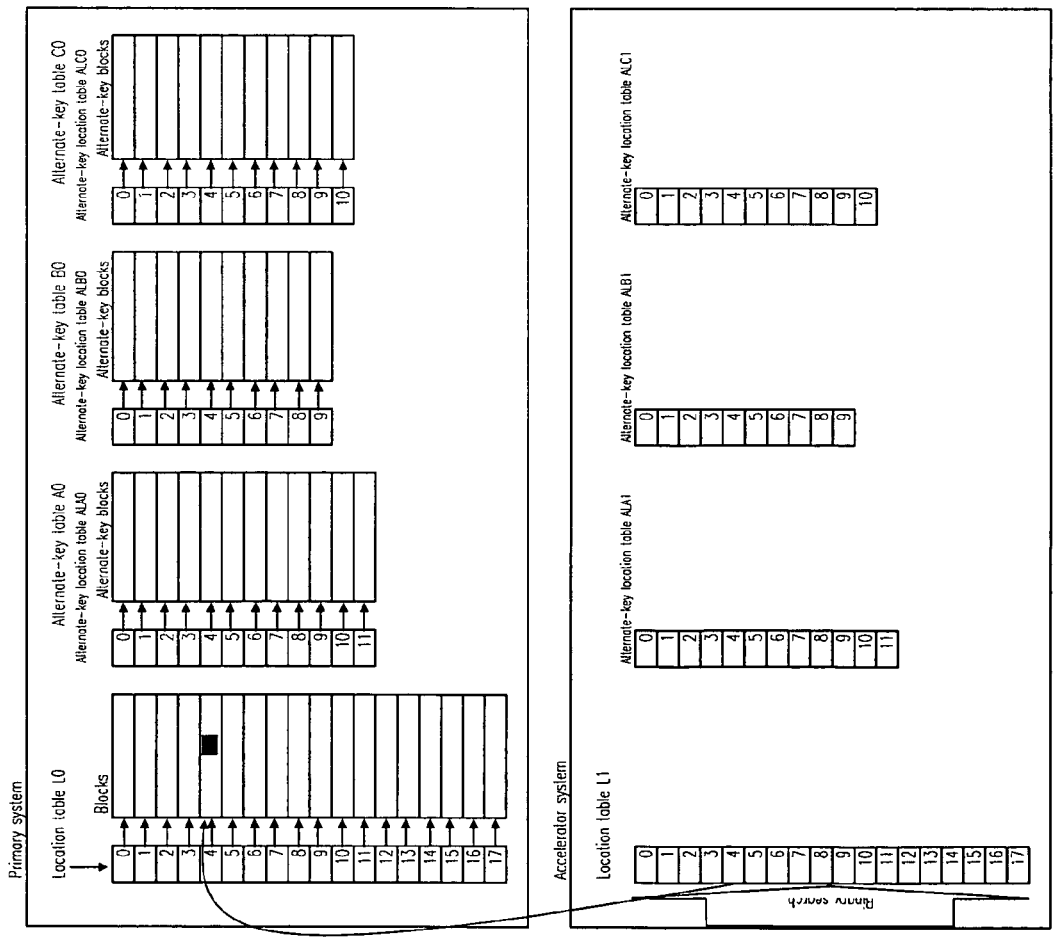
FIG. 9 is an example of retrieval by primary-key value on an accelerator system.

The recitation makes reference to FIG. 9 in describing retrieval by means of primary key on the accelerator system 1. Retrieval is performed with a target key value. Retrieval consists of using the location table 1 of the accelerator system 1 to perform a binary search between the leading address in L1 and the location table entry indicated by the final pointer of L1 and retrieving the location table entry that contains the target key value.

Assume the entry retrieved is that indicated by block number 4. Blocks do not exist on the accelerator system 1, but exist only on the primary system 0.

Retrieval of the record within the block is thus performed on block 4, which is on the primary system 0. If record having the target key value exists in block 4, that record is the target record. If no record having the target key value exists in block 4, this means that that record does not exist. Although this description refers to block number 4, it may apply generally to block number n. This applies likewise below.

Since retrieval does not occasion the updating of records, nor is the location table updated and information is not transmitted from the primary system to the accelerator system. Nor, in principle, is exclusion required.

Retrieval by Alternate Key on the Accelerator System 1

Figure 10:
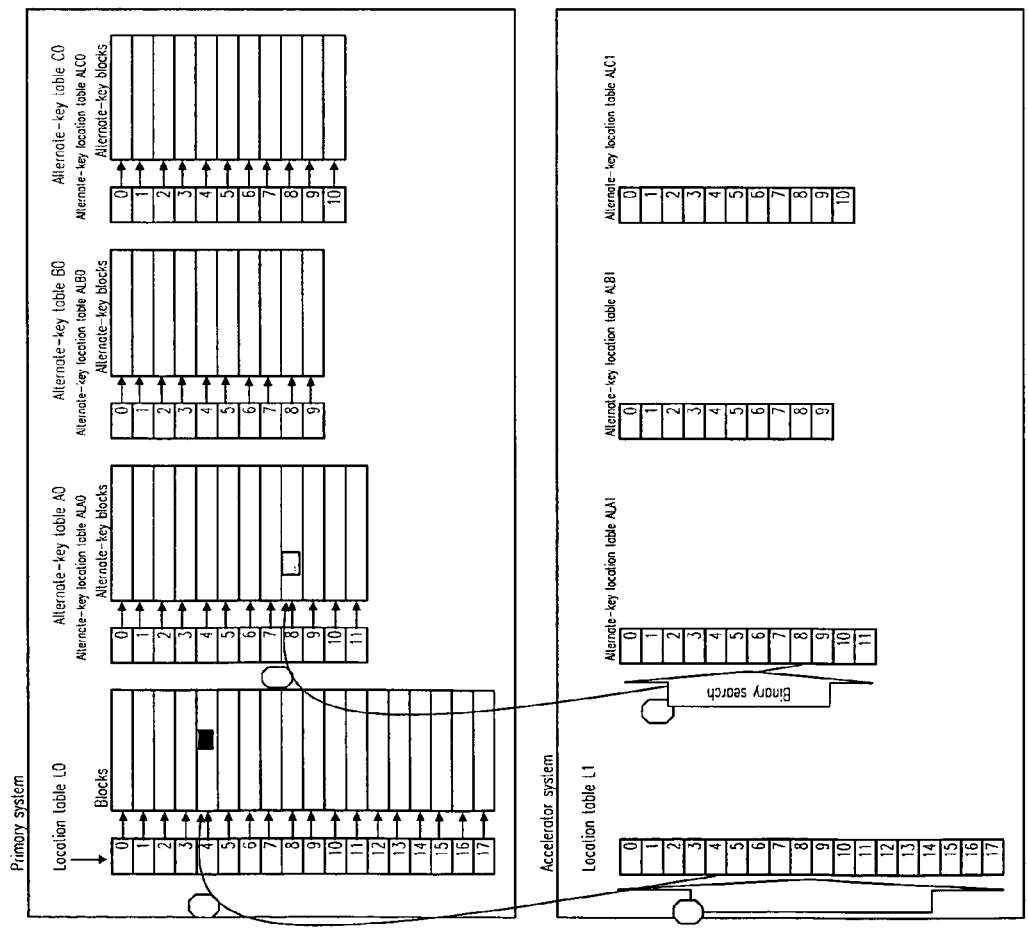
FIG. 10 is an example of retrieval of a record by alternate-key value on an accelerator system.

The recitation makes reference to FIG. 10 in describing retrieval by means of alternate key on the accelerator system 1. Retrieval is performed with a target key value. Here, the search is of the alternate key A. Retrieval consists of performing a binary search on the alternate-key location table ALA0 on the accelerator system 1 and retrieving the alternate-key location table entry (octagon 1 in FIG. 10) that contains the target key value.

Assume that the alternate-key entry retrieved points to alternate-key block number 8. Alternate-key blocks do not exist on the accelerator system 1, but exist only on the primary system 0.

Access to the alternate-key entry of the alternate-key block is thus performed by accessing alternate-key block 8 on the primary system 0. If an alternate-key entry having the target key value exists in alternate-key block 8, that alternate-key entry is the target entry. If an alternate-key entry having the target key value does not exist in alternate-key block 8, this means that no records having the target key value exist. If an alternate-key overflow block is linked to the alternate-key block, any such alternate-key overflow block is also made subject to the search (octagon 2 in FIG. 10). The example used here is that of alternate-key block number 8, but this may be generally expressed as alternate-key block number n.

This completes retrieval of the alternate-key entry. In addition to alternate-key values and the primary-key values of records having those alternate-key values, alternate-key entries also maintain, as necessary, the numbers of blocks that store records or the numbers of those blocks.

In order to retrieve the target record, it is necessary once again to use the location table L1 of the accelerator system 1 to find the block that contains the target record.

If the alternate-key entry maintains the block number, the location table L1 of the accelerator system 1 is searched directly. The product of the length of the entries in the location table L1 multiplied by the block number gives the offset from the top of the location table L1. The target record will be stored in the block indicated by the location table entry retrieved. The blocks referenced are those on the primary system 0. The record within that block is retrieved that has the primary-key value indicated by the alternate-key entry thus retrieved. If the alternate-key entry maintains the block address, that block on the primary system is referenced. The record within that block is found that has the primary-key value indicated by that alternate-key entry.

If it is of a format that maintains neither the block number nor the block address, a binary search is performed on the location table L1 of the accelerator system 1 with that primary key as the target key to retrieve the location table entry (octagon 3 in FIG. 10). The object record is retrieved on the basis of the block address thus found from that block on the primary system 0 (octagon 4 in FIG. 10). Since retrieval does not occasion the updating of records, nor is the location table updated and information is not transmitted from the primary system to the accelerator system. Nor, in principle, is exclusion required.

Addition, Updating and Deletion of Records on an Accelerator System

The foregoing recitation addresses retrieval by primary key and by alternate key. The addition, updating and deletion of records may be performed by applying methods that employ retrieval.

The addition of a record is executed by means of primary key.

Figure 11:
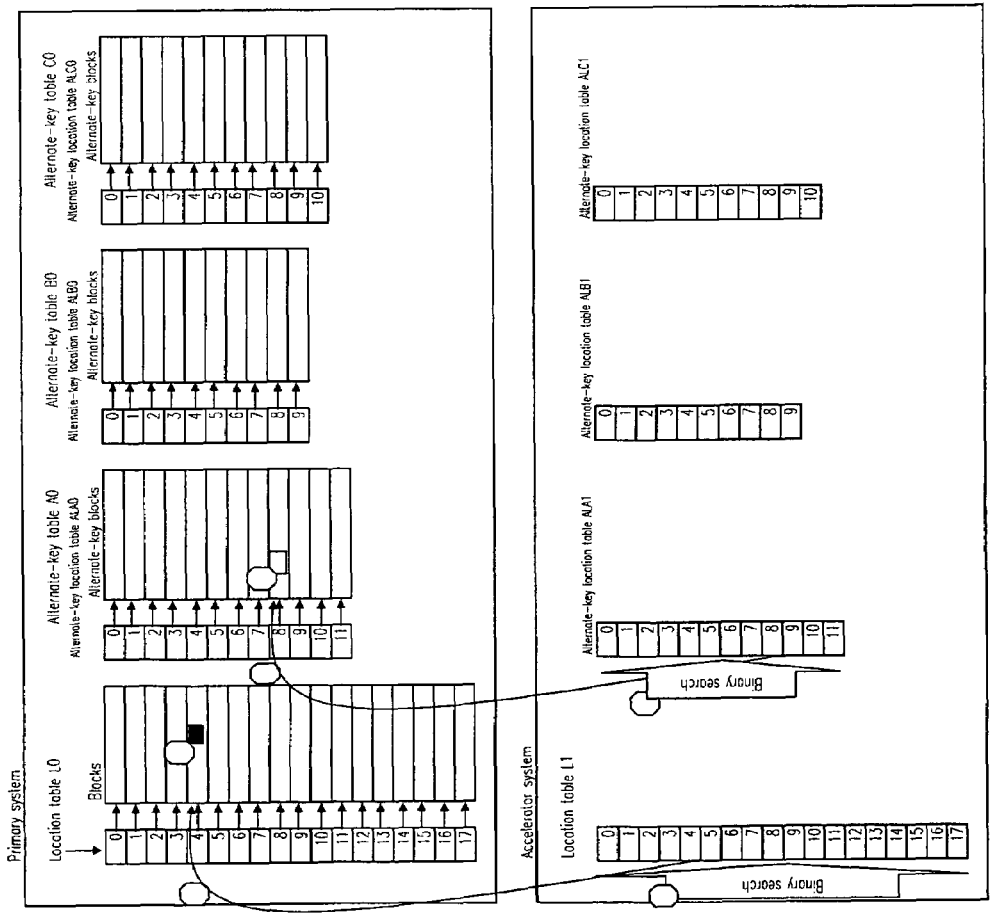
FIG. 11 is an example of the addition of a record on an accelerator system. The addition of the record here causes the addition of an alternate-key record, and the drawing illustrates the state of an alternate-key entry added to the alternate key A.

The recitation first makes reference to FIG. 11 to address the addition of records.

Addition of Records on an Accelerator System

The addition of a record on the accelerator system 1 consists of first performing a binary search on the location table L1 and retrieving the location table entry with the primary-key value of the record added (octagon 1 in FIG. 11).

Assume that the entry retrieved indicates block number 8. Since blocks do not exist on the accelerator system, but exist only on the primary system 0, it is those blocks that are accessed (octagon 2 in FIG. 11).

Since the processing request is an update request, the affected entry in the location table L0 on the primary system 0 and the block indicated by that entry are placed under exclusion.

The records in block 8 are examined, and the record found that has the greatest primary-key value among those with primary-key values less than the target key value. The record will be inserted at the address subsequent to that record.

Shifting within the block and other operations occasioned by insertion are likewise to those recited for the primary system (octagon 3 in FIG. 11).

This addition of record results in modification of the location table when the primary-key value of the record added becomes the high primary-key value in that block. If so, the information of the location table entry in the location table L0 of the primary system is updated. Consequently, update information for that location table entry is transmitted from the primary system 0 to the accelerator system 1. FIG. 11 illustrates an instance of no modification of the location table.

Since transmission is by a synchronous, tightly-coupled method, exclusion is not lifted on the primary system until updating on the accelerator system 1 has completed, and where the processing of new transactions entails placing the same block under exclusion, these operations then wait for exclusion to be lifted.

A special case of record addition is when a new block is created after the final block and the record stored therein, in which case a new block must be created and a new entry added to the location table to manage that block, but subsequent operations are likewise to those recited above for addition.

Exclusion is lifted after the completion of addition of alternate-key entries described below.

Addition of Alternate-Key Records Resulting from Addition of Records on an Accelerator System The addition of a record may result in the addition of an alternate-key entry. Although unnecessary where alternate keys are not used on a primary system, the recitation here addresses an instance of the existence of three types alternate keys (A, B and C).

Given three types alternate keys, the addition of a record may result in the addition of alternate-key entries for three different alternate keys. Operations are all the more simple where alternate-key entries are not created, as with unregistered keys, because there is no addition of alternate excluded keys e-key entries. Their description is therefore omitted here.

Three alternate-key entries Ae, Be and Ce are created. These must be stored in alternate-key tables A, B and C, respectively. The recitation addresses the case of alternate-key table A. A binary search is performed on the alternate-key location table ALA1 of the accelerator system 1 with the alternate-key value of Ae as the target key value (octagon 4 in FIG. 11).

Once retrieval of the target alternate-key location table entry has completed on the accelerator system, the alternate-key location table entry and the alternate-key block indicated by that alternate-key location table entry on the primary system 0 are placed under exclusion (octagon 5 in FIG. 11). In other words, since alternate-key blocks exist only on the primary system, operations performed on alternate-key blocks are executed on the primary system.

This operation being the insertion of Ae, the alternate-key entries in the object alternate-key block are examined. Since alternate keys are non-unique keys, entries may exist that have the same alternate-key value.

The recitation addresses first a case in which alternate-key entries exist that have an alternate-key value identical to the target key value. In this case, the primary key of the object alternate-key entry added is noted and, of those alternate-key entries that have the same alternate-key value, the alternate-key entry is inserted at the address subsequent to that alternate-key entry that has the greatest primary-key value among those having a primary-key value less than the primary-key value of the object alternate-key value added. In order to insert the alternate-key entry, alternate-key entries with higher-order addresses than the alternate-key entry inserted must be shifted in the higher-order direction by the amount of space that the object alternate-key entry added will occupy. When shifting in the higher-order direction results in the generation of an alternate-key overflow block, an alternate-key overflow block is added and alternate-key entries moved. The addition of the alternate-key entry is performed thereafter.

The recitation addresses next a case in which no alternate-key entries exist that have an alternate-key value that is the same as the target key value. In this case, the alternate-key entry is inserted at the address subsequent to the alternate-key entry having the greatest alternate-key value among those alternate-key entries having alternate-key values in the object block that have primary-key values less than the alternate-key value of the object alternate-key entry added. In order to insert the alternate-key entry, the alternate-key entries with higher-level addresses than the alternate-key entry inserted must be shifted in the higher-order direction by the amount of space that the object alternate-key entry added will occupy. When shifting in the higher-order direction results in the generation of an alternate-key overflow block, an alternate-key overflow block is added and alternate-key entries moved. The addition of the alternate-key entry is performed thereafter (octagon 6 in FIG. 11).

The addition of an alternate-key entry results in modification of an alternate-key location table when the alternate-key location table entries contain the high alternate-key values and the alternate-key value inserted becomes the high key value in that alternate-key block. If so, the information in that alternate-key location table entry in the alternate-key location table L0 is updated.

Consequently, update information for that alternate-key location table entry is transmitted from the primary system 0 to the accelerator system 1.

Since transmission is by a synchronous, tightly-coupled method, exclusion is not lifted on the primary system until updating on the accelerator system 1 has completed, and where the processing of new transactions entails placing the same block under exclusion, these operations then wait for exclusion to be lifted. Addition of alternate-key entries is performed likewise for alternate-key tables B and C. FIG. 11 illustrates the point at which addition of the alternate-key entry to the alternate-key table A has completed.

Once the addition of the alternate-key entries to the alternate-key tables A, B and C has completed, the exclusion imposed is lifted.

Updating Records by Primary Key on an Accelerator System

Figure 12:
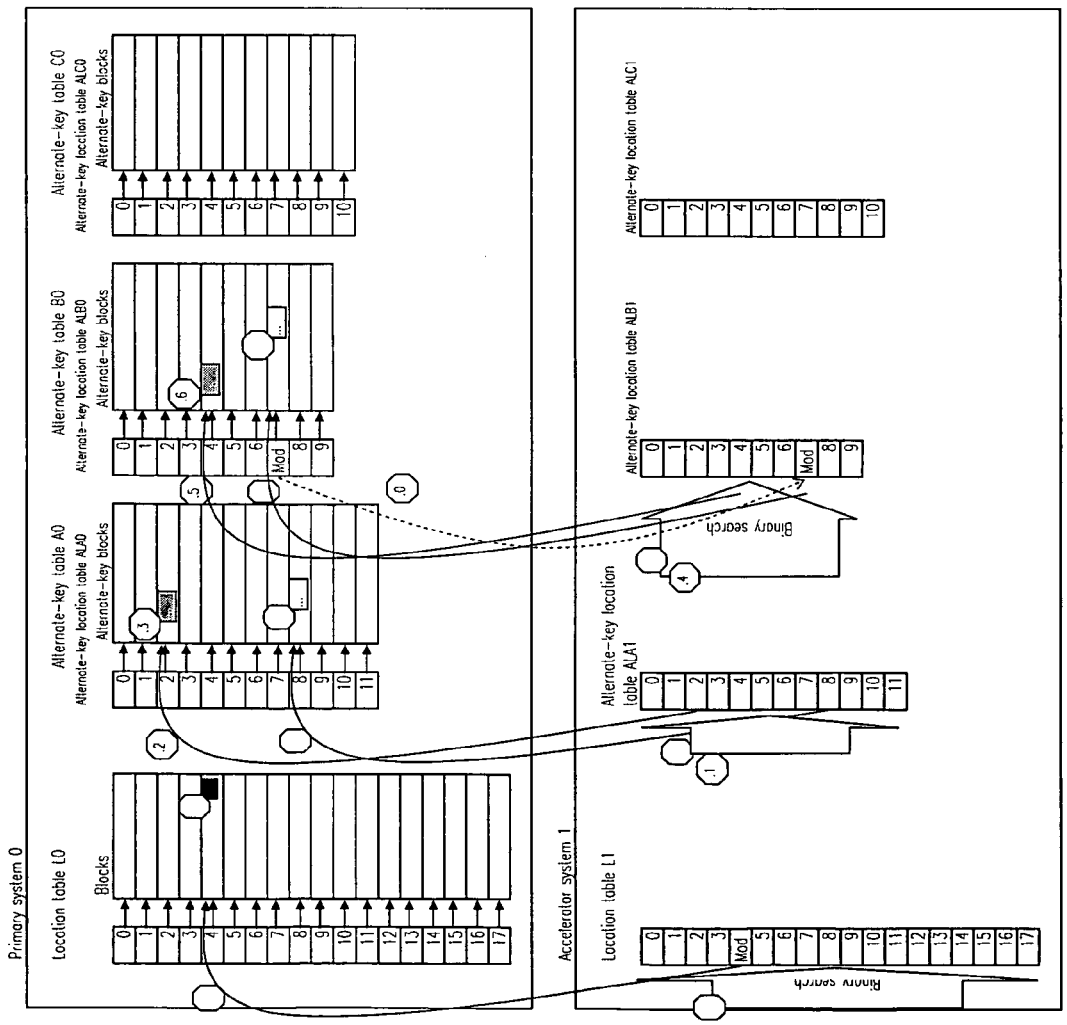
FIG. 12 is an example of the updating of a record by primary key on an accelerator system. The updating of the record here causes the addition and deletion of alternate-key entries, and the drawing illustrates the state of alternate-key entries added to and deleted from alternate keys A and B.

Updating Blocks Resulting from Updating Records by Primary Key on an Accelerator System The recitation makes reference to FIG. 12 in addressing the performance of processing based on record update requests on the accelerator system 1. First, a binary search is performed on the location table L1 to retrieve the location table entry having the primary-key value of the record updated (octagon 1 in FIG. 12).

Assume that the entry retrieved points to block number 4. Since the block exists on the primary system, access is directed there.

Retrieval of the record from the block is thus performed on block 4 on the primary system 0 (octagon 2 in FIG. 12). Since the processing request here is for updating, the following operations are performed after placing the affected entry in the location table L0 on the primary system 0 and the block that that entry indicates under exclusion.

The records in block 4 are examined and the record found that has the same primary-key value as the target key value, which record is that to be updated (octagon 3 in FIG. 12). If no record that has the target key value exists in the block, this means that no such record exists. FIG. 11 illustrates the existence of a record. The recitation has addressed the case of block number 4, but it may be applied generally to block number n.

Records are updated in this way, but since the updating of primary-key values is not permitted, the location table L0 is not modified. The method employed to update a primary-key value is to delete the record with that primary-key value and then add a record with a new primary-key value. Therefore, the recitation of the addition and deletion of records is sufficient to describe the "modification" of a primary key.

Exclusion is lifted after the completion of addition of alternate-key entries described below.

Addition and Deletion of Alternate-Key Entries Resulting from Updating Records by Primary Key on an Accelerator System Updating a record may result in the update of an alternate-key entry, which in fact consists of addition and deletion. Although not required for a primary system on which alternate keys are not used, the recitation here addresses an instance of the use of three types alternate keys (A, B and C). Not every record update entails updating an alternate-key entry, but an alternate-key entry must be updated when an data item (field) in a record that is specified by an alternate-key is updated.

Where three type alternate keys are present, the update of a record may result in the update of from zero to three alternate-key entries. Operations are all the more simple where alternate-key entries are not created, as with excluded keys, because there is no addition of alternate-key entries. Their description is therefore omitted here.

The example described here is one in which entries are updated for all alternate keys. The three new alternate-key entries Aen, Ben and Cen are created, and their alternate-key entries must be added. On the other hand, the alternate-key entries Aeo, Beo and Ceo previously in the record are no longer required and must be deleted. FIG. 12 illustrates an instance in which alternate-key tables A and B are modified and C is not modified.

Each of the two alternate-key entries Aen and Ben must be stored in the alternate-key tables A and B, respectively. The recitation addresses the case of the alternate-key table A0. A binary search is performed on the alternate-key location table AL1 on the accelerator system 1 with the alternate-key value of Aen as the target key (octagon 4 in FIG. 12).

Subsequent operations are likewise to those for the addition of a record resulting in the addition of an alternate-key entry and so are omitted here (octagons 5 and 6 in FIG. 12). Operations for Ben are also likewise to those for Aen. FIG. 12 illustrates modification of the alternate-key location table entry ALB0 resulting from the addition of Ben. Here, modification information for the alternate-key location table entry is transmitted to the accelerator system 1 after the operations of octagons 7, 8 and 9 in FIG. 12. This information is used to update that alternate-key location table entry on the accelerator system 1 (octagon 10 in FIG. 12).

Next, the alternate-key entries Aeo and Beo must be deleted from the alternate-key tables A and B, respectively. As above, the description here is with respect to Aeo. The alternate-key location table AL1 on the accelerator system 1 is used to perform a binary search with the alternate-key value in Aeo as the target key (octagon 11 in FIG. 12).

Once the target alternate-key location table entry has been retrieved, that alternate-key location table entry and the alternate-key block indicated by that alternate-key location table entry on the primary system 0 are placed under exclusion (octagon 12 in FIG. 12).

The deletion performed here being that of Aeo, the alternate-key entries in the object alternate-key block are examined. Since alternate keys are non-unique keys and therefore alternate-key entries may exist that have the same alternate key, the alternate-key entry that matches the alternate-key value and primary-key value is found and that alternate-key entry is deleted (octagon 13 in FIG. 12). Operations within alternate-key blocks when an alternate-key entry is deleted are likewise to those for access on the primary system.

This addition of an alternate-key entry is performed likewise for alternate-key table B. FIG. 12 illustrates the deletion of Beo (octagons 14, 15 and 16 in FIG. 12).

Once the addition and deletion of alternate-key entries in alternate-key tables A, B and C has completed, the exclusion imposed is lifted.

Updating Records by Alternate Key on an Accelerator System

Figure 13:
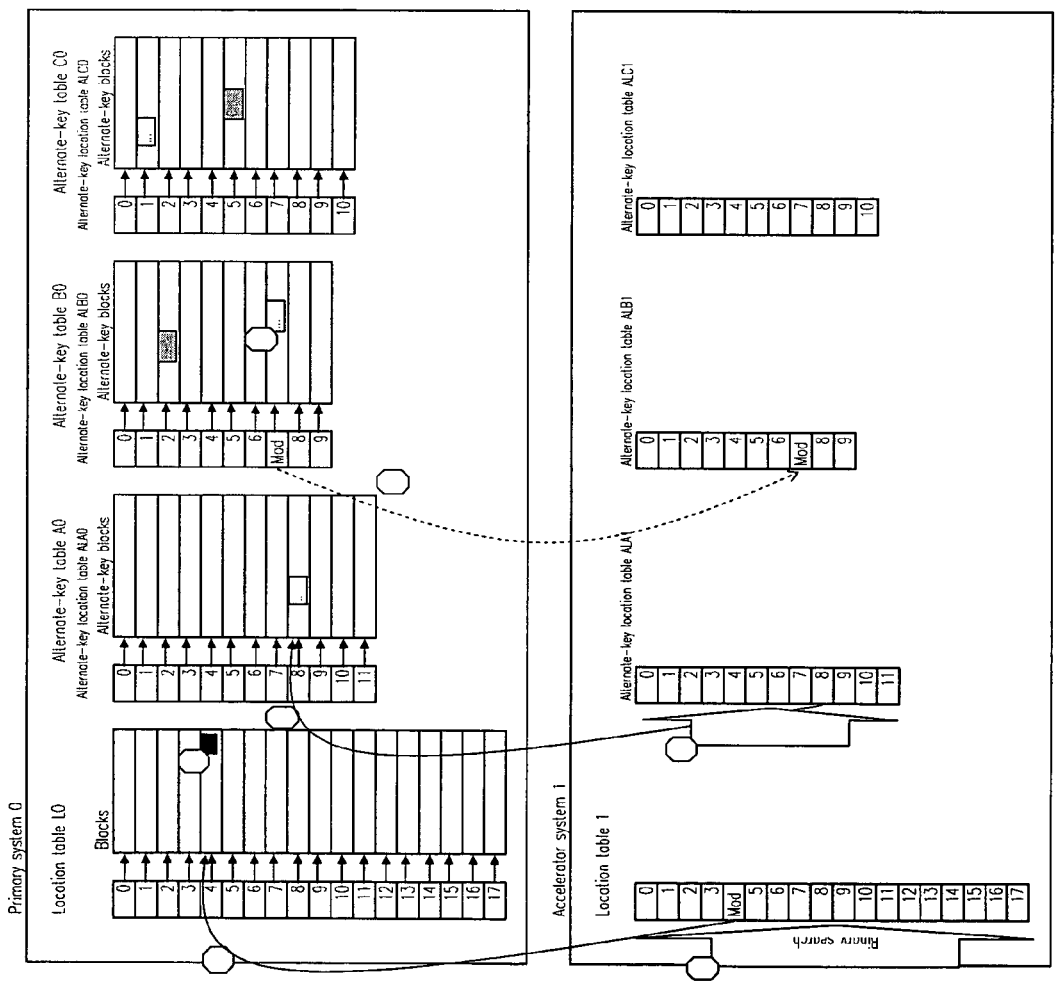
FIG. 13 is an example of the updating of a record by alternate key on an accelerator system. The updating of the record here causes the addition and deletion of alternate-key entries, and the drawing illustrates the state of alternate-key entries added to and deleted from alternate keys B and C and the modification of alternate-key location table ALB0.

The recitation makes reference to FIG. 13. Updating a record on the accelerator system 1 consists first of performing a binary search on the alternate-key location table ALA1 to find the alternate-key location table entry having the alternate-key value of the record updated (octagon 1 in FIG. 13). After the alternate-key location table entry is retrieved, a search is performed within the alternate-key block on the primary system 0 indicated by that alternate-key location table entry to retrieve the alternate-key entry (octagon 2 in FIG. 13). Once the alternate-key entry has been retrieved, once again the location table L1 on the accelerator system 1 is used to perform a binary search (octagon 3 in FIG. 13) and retrieve the block in which the record is stored (octagon 4 in FIG. 14).

The operations are likewise to the methods recited for retrieval by alternate key.

Since alternate keys are non-unique keys, record retrieval by alternate key may return multiple records. The execution of update by alternate key consists of sequentially reading records having the same alternate-key value and selecting whether or not to update each one according to its primary key and data content. Here multiple records are updated sequentially.

Assume that the location table entry retrieved indicates block number n. Since the block exists on the primary system, access is directed there. Retrieval of the record within the block is performed on block n on the primary system 0.

The records in block n are examined, the record found that has a primary key that is the same as the target key (octagon 5 in FIG. 13) and the record updated. That updating of primary keys is not permitted is likewise to the recitation of updating records by primary key.

Exclusion is lifted after the completion of addition of alternate-key entries described below.

Deletion of Records by Primary Key on an Accelerator System

When a record is deleted, an alternate-key entry may be deleted. Although unnecessary where alternate keys are not used on a primary system, the recitation here addresses an instance of the existence of three type alternate keys (A, B and C). The deletion of a record necessarily requires the updating of an alternate-key entry.

Given the use of three type alternate keys, the deletion of a record may result in the deletion of three alternate-key entries.

The alternate-key entries Ae, Be and Ce employed above are the objects of deletion.

The deletion of an alternate-key entry is likewise to the recitation of deletion in the addition and deletion of alternate-key entries and so is omitted here.

It is when the alternate-key value added becomes the high key value in its block and when the alternate-key value deleted had been either the low or the high key value in its block that this addition and deletion of alternate-key entries results in modification of an alternate-key location table. If so, the information of that alternate-key location table entry in its alternate-key location table is updated.

Consequently, update information for that alternate-key location table entry is transmitted from the primary system 0 to the accelerator system 1. This addition of an alternate-key entry is performed likewise on alternate-key tables B and C.

Once the addition and deletion of the alternate-key entries in alternate-key tables A, B and C has completed, the exclusion imposed is lifted.

Deletion of Records by Alternate Key on an Accelerator System

Deleting a record by alternate key on the accelerator system 1 consists, first, of performing a binary search on the alternate-key location table AL1 to retrieve the alternate-key location table entry having the alternate-key value of the record deleted.

After retrieval of the alternate-key location table entry, a search is performed within the alternate-key blocks on the primary system to find the alternate-key entry. Once the alternate-key entry is retrieved, a binary search is performed on the location table L1 to retrieve the block in which the record is stored.

These operations are likewise to the methods recited for retrieval of records by alternate key.

Since alternate keys are non-unique keys, retrieval of records by alternate-key value may return multiple records. The execution of deletion by alternate key consists of sequentially reading object records having the same alternate-key value and selecting whether or not to delete each one according to its primary key and data content. Here multiple records are deleted sequentially. Assume the location table entry retrieved points to block n. Since blocks exist on the primary system 0, access is directed there. Retrieval of the record from within the block is performed on block n on the primary system 0.

The records in block n are examined and the record found that has the same primary-key value as the target key value. Then, likewise as for the deletion of records by primary key, the region in the block that had been occupied by the deleted record is closed up and, if necessary, the location table entry updated and the alternate-key entry deleted.

In this way are records deleted. Once this sequence of operations has completed, exclusion is lifted.

The recitation foregoing thus describes operations on the primary system and attendant operations on an accelerator system entailed in the retrieval, addition, updating and deletion of data (records) on the accelerator system.

Deployment of Multiple Accelerator Systems

Although the recitation foregoing addresses the existence of an accelerator system 1, multiple accelerator systems may be deployed. Operations where accelerator systems 2, 3, 4 . . . n exist are almost likewise to those for a single accelerator system. The difference is that when the location table or an alternate-key location table is modified on the primary system, instead of transmitting information only to the accelerator system 1 and waiting for the updating of information to complete, the primary system transmits information to all of the accelerator systems 2, 3 . . . n and waits for updating of the information to complete on all of the accelerator systems.

Although the location table and alternate-key location tables are first updated on the primary system, this may be initiated by a request for the addition, updating or deletion of data from any of the accelerator systems, in addition to requests for the addition, update or deletion of data on the primary system. When the location table or an alternate-key location table on the primary system is updated by a request for the addition, updating or deletion of data from an accelerator system 1, 2, 3 . . . n, that update information is transmitted to all of the acceleration systems and their updates synchronized.

Since update information is thus transmitted from the primary system to all of the accelerator systems and the necessary updating must be performed immediately on all of the accelerator systems when the location table or an alternate-key location table is modified on the primary system, it may seem to suffer decreased efficiency. However, when location table and alternate-key tables maintain both low and high key values or either one of those, it is when one of those key values is modified that the location table or an alternate-key table is modified, and in this light the advantages may be seen that the volume of data transmissions is far lower than such conventional methods of maintaining complete mirror copies since such modification is far less frequent than that of the updating, addition and deletion of records, and that the storage space required by an accelerator system may be far less than that of a primary system. Moreover, since entries are retrieved independently on the individual accelerator systems, the system load may be distributed and considerable improvement in scalability achieved over conventional methods.

Symmetrical Systems

Figure 14:
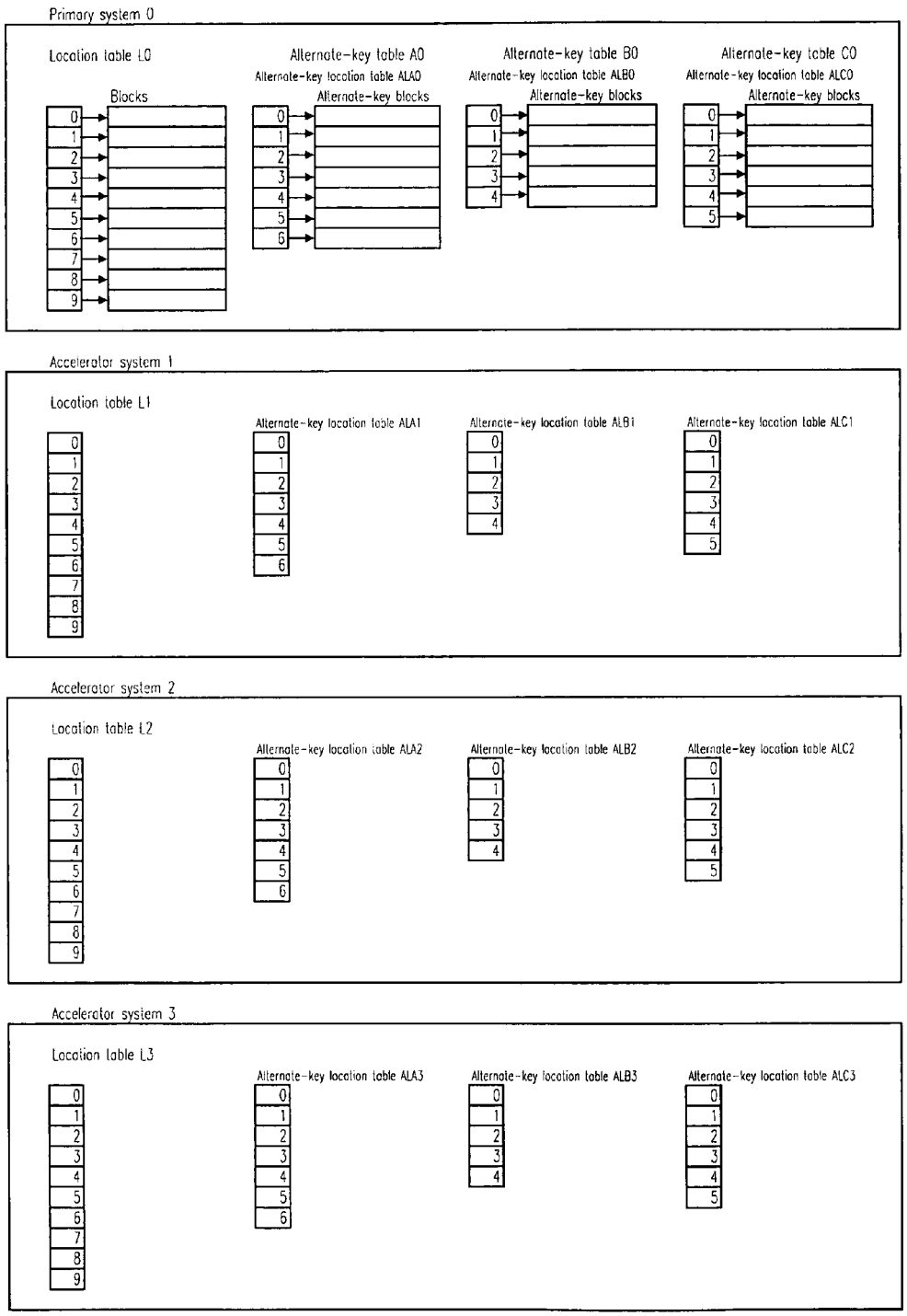
FIG. 14 is an example of a symmetrical accelerator system.

The foregoing recitation shows that when a primary system is configured with a single location table and an alternate-key table for each of k alternate keys, a number of n accelerator systems may be deployed configured with a set of 1+k of these tables (symmetrical accelerator systems). FIG. 14 is an example of three symmetrical accelerator systems for a primary system.

Asymmetrical Systems

Another possible approach is to configure asymmetrical accelerator systems. The recitation makes reference to FIG. 15. This method is one that determines, according to their frequency of access, the number on each accelerator system of the location table and alternate-key location tables for each of the location table and the alternate keys A, B, C . . . on the primary system. The recitation addresses the example of a primary system with a location table and alternate-key location tables AL0, BL0 and CL0 for three alternate keys.

An accelerator system 1 has a location table L1 and alternate-key location tables ALA1, ALB1 and ALC1, which is the same configuration as the primary system. An accelerator system 2 has a location table L2 and alternate-key location tables ALB2 and ALC2, a configuration that, compared with the primary system, lacks an alternate-key location table ALC2. This arrangement is illustrated in FIG. 15.

Likewise, an accelerator system 3 has a location table 3 and an alternate-key location table ALC3.

This is advantageous when the utilization frequencies of primary keys and each of the alternate keys are known and there are large differences in those frequencies. This is because a symmetrical accelerator system will have tables that see little utilization and exhibit waste of storage space.

It is further preferable to acquire per-key statistics for the accelerator systems and modify the number of each such accelerator when accesses per primary key and per each alternate key vary. Further, modification of these numbers may be automated as follows.

The recitation addresses below automation procedures.

First, accelerator system statistics are acquired for each key. The per-key volume of access is then compared for each key. Where accesses are above a certain level, an asymmetrical accelerator is added.

Take as an example the following deployment of asymmetrical accelerator systems.

Asymmetrical accelerator system 1:
Location table L1
Alternate-key location table ALA1
Alternate-key location table ALB1
Alternate-key location table ALC1
Asymmetrical accelerator system 2:
Location table 2
Alternate-key location table ALB2
Alternate-key location table ALC2
Asymmetrical accelerator system 3
Location table 3
Alternate-key location table ALC3

Given this configuration, when access to the alternate-key table A rises and its addition reckoned to be necessary, an alternate-key location table ALA2 is added to the asymmetrical accelerator system 2. It might either be added to the asymmetrical accelerator system 3, but this example assumes addition to that accelerator system with the lower number. The addition is effected as recited below.

Either the primary system or a status monitoring system determines whether to add an alternate-key location table AL0 to an accelerator system. After it is so determined, the accelerator system 2 is commanded to secure space for an alternate-key location table ALA2. On the accelerator system 2 the space is secured on the basis of that information. Once the space is secured, a transmission to that effect is made to the primary system. The primary system then transmit all of the entries of the alternate-key location table ALA0 to the accelerator system 2 as an A log. Any A logs resulting from data updates that occur before the transmission is completed are likewise transmitted.

The affected entries in the alternate-key table 2A are sequentially updated on the accelerator system 2 on the basis of the A log content. Synchronization has completed at the point when all A log updates have completed, and it is then possible to utilize the alternate-key location table ALA2. Even during the transmission from the primary system to the accelerator system and the creation of the alternate-key location table ALA2 on the accelerator system, access to the alternate key A is possible on the primary system and on the accelerator system 1.

Figure 16:
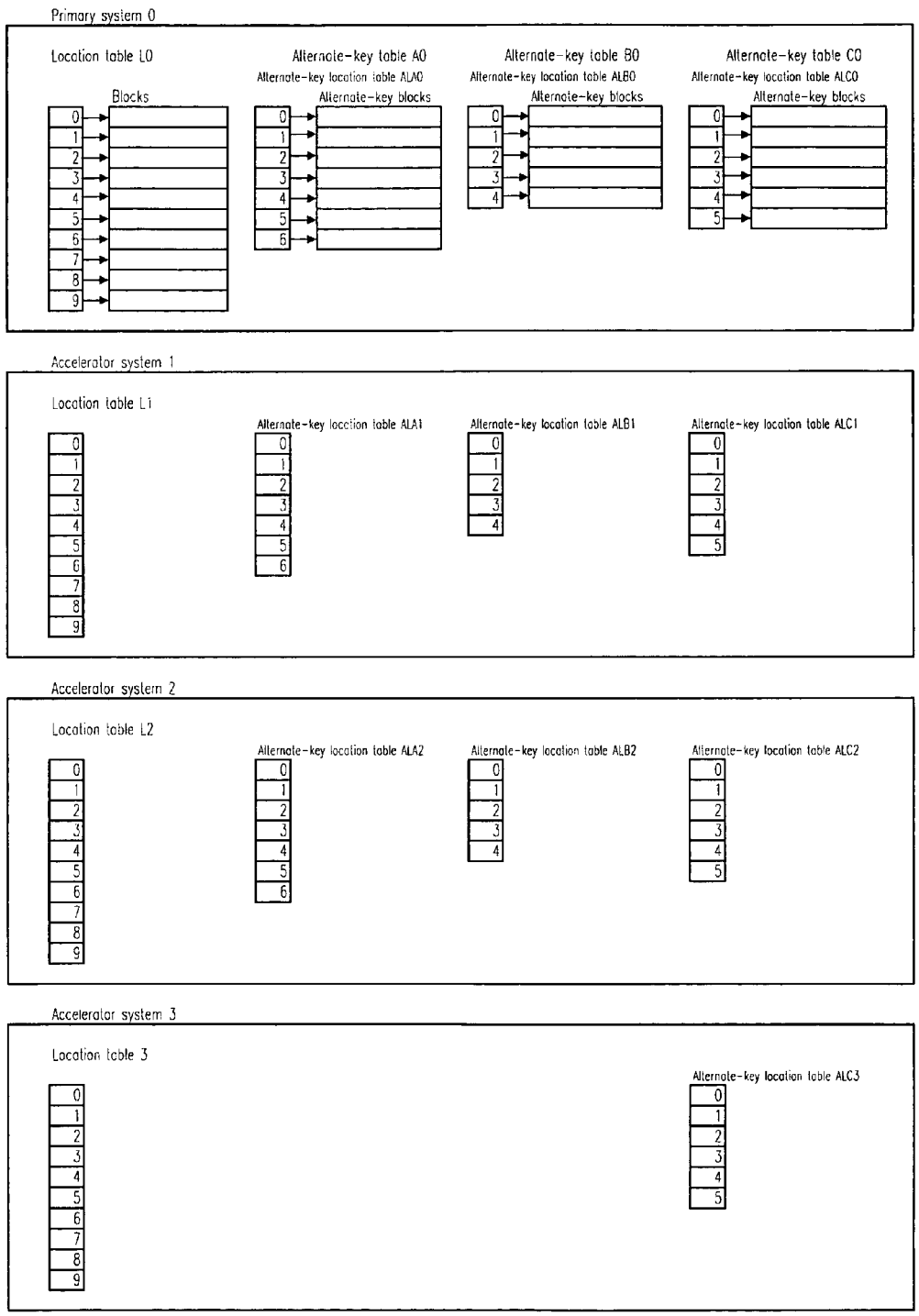
FIG. 16 is an example of the addition of an alternate-key location table ALA2 on an asymmetrical accelerator system.

Although the example recited above is of the transmission of information from the primary system, the transmission may also be made from an accelerator system other than the accelerator system 2 when the load on the primary system is excessive. FIG. 16 illustrates the state after the completion of the addition of the alternate-key location table ALA2 to the accelerator system 2.

In order to achieve acceleration in the application of the procedure recited above, it is preferable to allocate a processor to each accelerator. To further enhance acceleration, it is preferable to allocate a processor to each of the location tables and the alternate-key location tables of the acceleration systems.

An accelerator system may be housed in the same hardware system as the primary system, but it is also possible to separate each accelerator system into a different hardware system from the primary system.

Since the incidence of table access rises when the number of accelerator systems is thus increased, the incidence of retrieval-object block access increases and the limits of processor block-access performance may be reached, but the load may be distributed by separating the blocks into multiple banks and assigning a processor to each one.

Accelerator System Variations

The foregoing recitation gives a basic description of accelerator systems. The framework of the recitation is deployment of a primary system on one hardware system and deployment of accelerator systems on separate hardware systems. This facilitates understanding of the essential issues of accelerator systems. However, since the load on the primary system is greater than that on the accelerator systems when the primary system is deployed on a single hardware system, this may in fact restrict enhancement of processing power.

Figure 17:
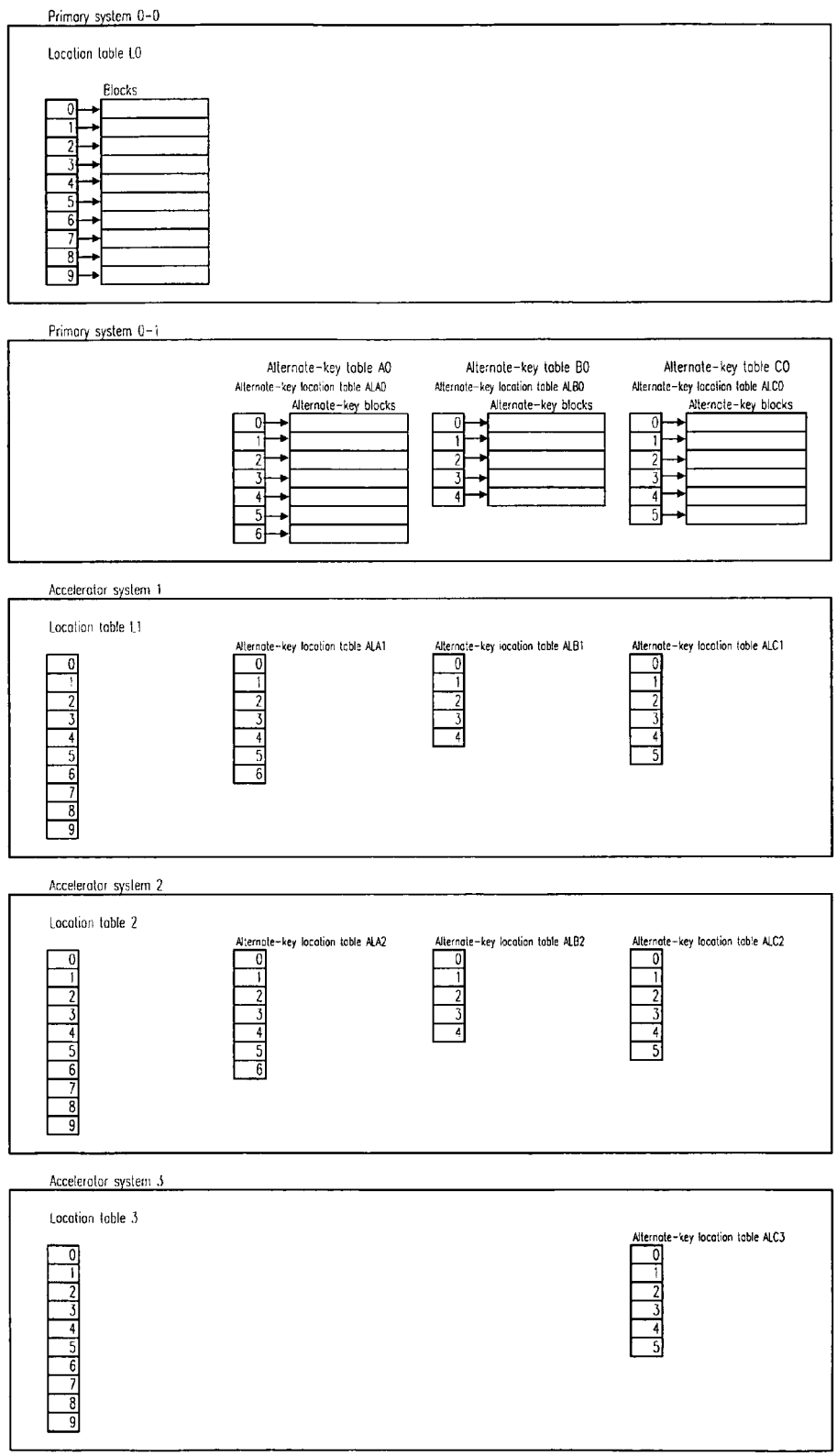
FIG. 17 is an example of a primary system distributed across multiple hardware systems in an asymmetrical accelerator system.

An effective means of avoiding such problems is to deploy a distributed primary system, as follows. FIG. 17 gives one example. The location table and blocks of a primary system are deployed on a primary system 0-0, and its alternate-key tables A0, B0 and C0 deployed on a primary system 0-1.

Another possible method is to allocate multiple CPUs to a primary system and distribute searching and updating within blocks, transmission of modification information to accelerator systems and reception of update completion from accelerator systems.

In addition to the above, the following methods are also possible. Although the foregoing recitation describes the existence of a single database on a primary system, most actual information processing systems use multiple databases. An example is the deployment of the primary system of a database α on a hardware system 0, deployment of the primary system of a database β on a hardware system 1 and deployment of the primary system of a database γ on a hardware system 2. The accelerator systems of the database α are then deployed on the hardware systems 1 and 2. The accelerator systems of the database β are deployed on the hardware systems 0 and 2. The accelerator systems of the database γ are deployed on the hardware systems 0 and 1.

It has been stated that each accelerator system should have multiple CPUs, and a primary system should likewise have multiple CPUs. This is because they are subjected a variety of loads, including searching and updating the content of blocks and alternate-key blocks and communications with accelerator systems, in addition to searching the location table and alternate-key location tables.

Superiority in Storage Space

The recitation addresses the superiority in terms of smaller storage space compared with using mirror files or using a secondary system for referencing, as shown in the invention of the Data Backup and Recovery System.

Use of secondary systems or mirror files requires space of the same size as current systems. On the other hand, although it is impossible to state strictly the space required for the use of accelerator systems because it varies with such conditions as location table and alternate-key table size, record length, key length, block size, block storage rates and number of alternate keys relative to the space required for the blocks overall, the size of the location table may be estimated at around one one-hundredth that of the files and the size of an alternate-key table for one alternate key at around one-tenth that of the files. And the size of an alternate-key location table within an alternate-key table may be estimated at around one one-hundredth its size. This is given assumptions of a record length of 400 bytes, a block length of four kilobytes, a location table entry size of 40 bytes and an alternate-key entry size of 40 bytes.

To compare with the use of secondary systems and mirror files, therefore, the use of alternate-key tables for five alternate keys and six symmetrical accelerator systems would require, as shown below, no more than around one-fifth the storage capacity required for the use of secondary systems or mirror files. It may easily be seen that increasing the number of accelerator systems further raises their advantageousness.

The size of the primary system (total size for a block size of 1) will be as follows:

1+1/100+5×(1/10)=151/100

The space for six secondary systems or mirror files will be as follows:

(151/100)×6=906/100 or six times that of the primary system.
Given the use of six symmetrical accelerator systems, it is:

(1/100+(1/10)*(1/100))×6=66/1000

Therefore, the ratio of their storage requirements is:

(905/100):(65/1000)=139:1

In other words, it is shown that the use of accelerator systems requires no more than around 1% of the storage space required for the use of secondary systems or mirror files.

Combination with a Backup and Recovery System

Next, the recitation describes the capability of simultaneous use with the Data Backup and Recovery System.

Backup and recovery may be in a synchronous, tightly-coupled system or an asynchronous, loosely-coupled system. Updating of a location table and/or alternate-key location tables in a synchronous, tightly-coupled backup and recovery system and an accelerator system is executed synchronously. However, since backup and recovery entails much more updating of blocks and/or alternate-key blocks (including any overflow blocks of each) than it does updating of a location table and/or alternate-key location tables, an accelerator system need not be updated each time a secondary system in a backup and recovery system is updated.

If the backup and recovery system is an asynchronous, loosely-coupled system, the accelerator systems alone are executed as synchronous, tightly-coupled systems.

Combination with a Reorganization System

Next, the recitation describes the capability of simultaneous use with the Database Reorganization System.

When reorganization is performed on the primary system, simultaneously on the accelerator systems a new location table is provided for the current location table and reorganization executed on the location table and blocks. Reorganization of the primary system and accelerator systems is executed synchronously.

A reorganization pointer is also maintained on an accelerator system and synchronized with the reorganization pointer of the primary system. Synchronization consists of having the location table entry pointed to by the reorganization pointer be the same on both the primary system and the accelerator system.

When the target key in retrieval is less than the lowest primary-key value in the location table pointed to by the reorganization pointer, a binary search is performed on the new location table to retrieve the target record, and when the target key in retrieval is greater than or equal to the lowest primary-key value in the location table pointed to by the reorganization pointer, the current location table is used.

Likewise, when reorganization is performed on an alternate-key table on the primary system, simultaneously on the accelerator systems a new alternate-key location table is provided to the current alternate-key location table and reorganization executed on the alternate-key location table and alternate-key blocks. Reorganization of the primary system and accelerator systems is executed synchronously.

A reorganization pointer is also maintained on an accelerator system and synchronized with the reorganization pointer of the primary system. Synchronization consists of having the location table entry pointed to by the reorganization pointer be the same on both the primary system and the accelerator system.

When the target key in retrieval is less than the lowest alternate-key value in the frond alternate-key location table pointed to by the reorganization pointer, a binary search is performed on the new frond alternate-key location table to retrieve the target alternate-key entry, and when the target key in retrieval is greater than or equal to the lowest primary key value in the frond alternate-key location table pointed to by the reorganization pointer, the frond current alternate-key location table is used.

Once the alternate-key entry is found, the block is found from the frond location table and the record retrieved on the basis of the information in that alternate-key entry.

Thus, there is capability for combination with a reorganization system.

Location tables in the Data Storage and Retrieval System may also have a structure in which they maintain the number of the location table (i.e. the number of the primary block), the location of the block and both or either one of the low and high primary-key values of the records in a block. The load on the blocks is greater when primary-key values are not maintained in a location table because, although there is less updating of the location table, a block must be read each time a binary search searches in the block in order to determine whether it is the target block, and the maintenance of key values in the location table is therefore preferable in applications of the present invention. If both the low and high key values are maintained, it may be determined whether a block is the target block merely by reading that entry. If one or other of the two is maintained, the issue may be resolved by reading either the subsequent entry or the prior entry.

Except in reorganization, the location of blocks maintained by the entries in location tables does not change, and there is far less modification of location tables than in the indices of conventional methods because modification of a location table occurs when both or either of the low value and high value of the records contained in a block are modified. Conventional methods entail a great deal of modification because elements corresponding to blocks are split and the number of elements corresponding to location table entries rises and falls. Furthermore, since the indices of conventional methods have hierarchical structures, there is frequent modification in the higher levels of the hierarchy is this is another cause of frequent modification of the indices of conventional methods.

Where multiple accelerator systems exist in an implementation of the present invention and their number increases, the primary system notifies each one of modifications and suffers an increased load waiting for their results. An advantageous way of alleviating this load is to use broadcasting to notify secondary systems of modifications.

Individual secondary systems each transmit notification to the primary system that updates on their secondary location tables have completed.

The recitation addresses how requests are allocated to individual accelerator systems. In addition to such formats as SQL, requests to the data storage and retrieval system may be made in a Read/Write interface, which in the end gives the following information.

1. Key requested (primary key, alternate-key A, B, C . . . )
2. Access requested (read, write, rewrite, delete, insert, etc.)
3. Key value requested
4. Data content (for an insert request)

Figure 20:
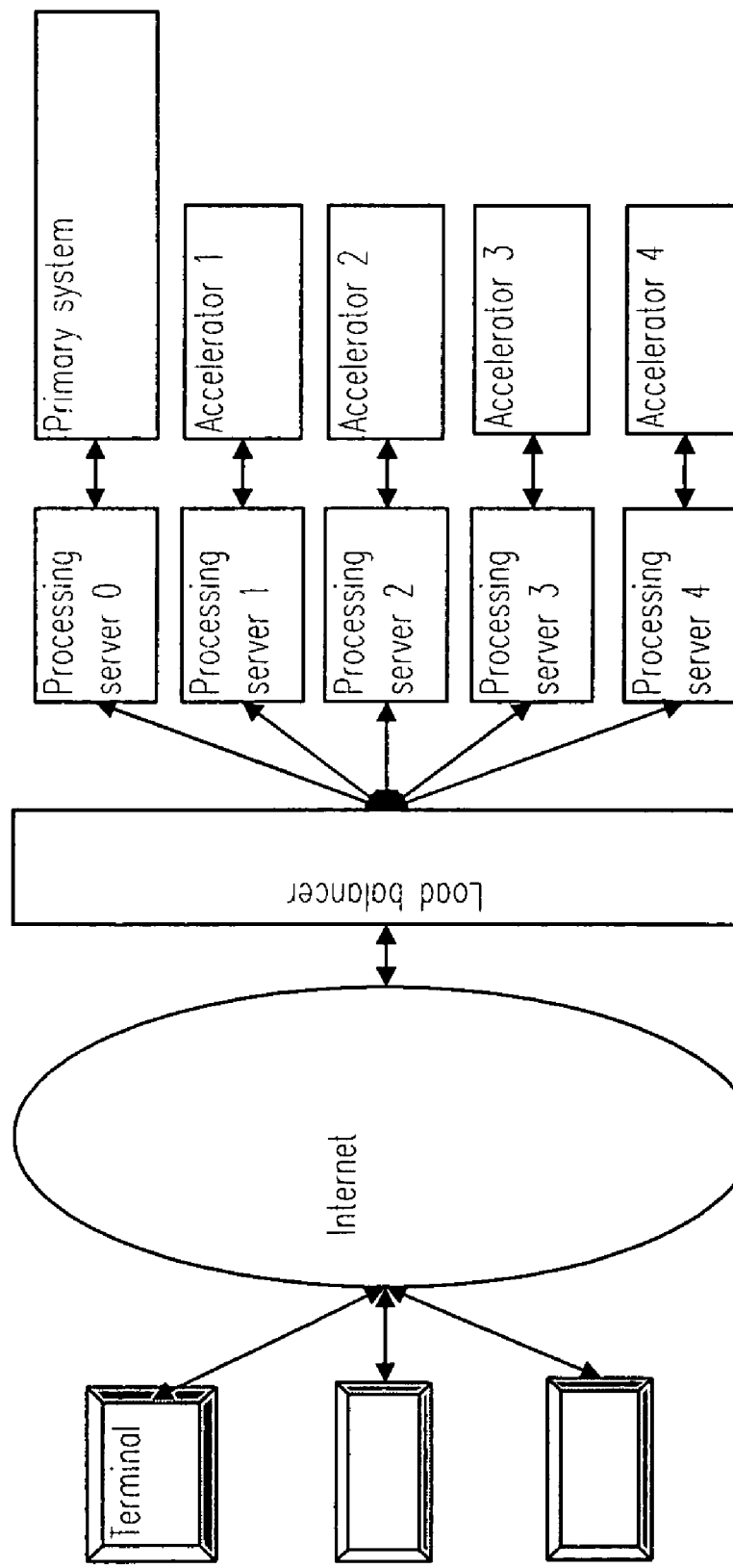
FIG. 20 is an example of request allocation employing a load balancer.
Figure 21:
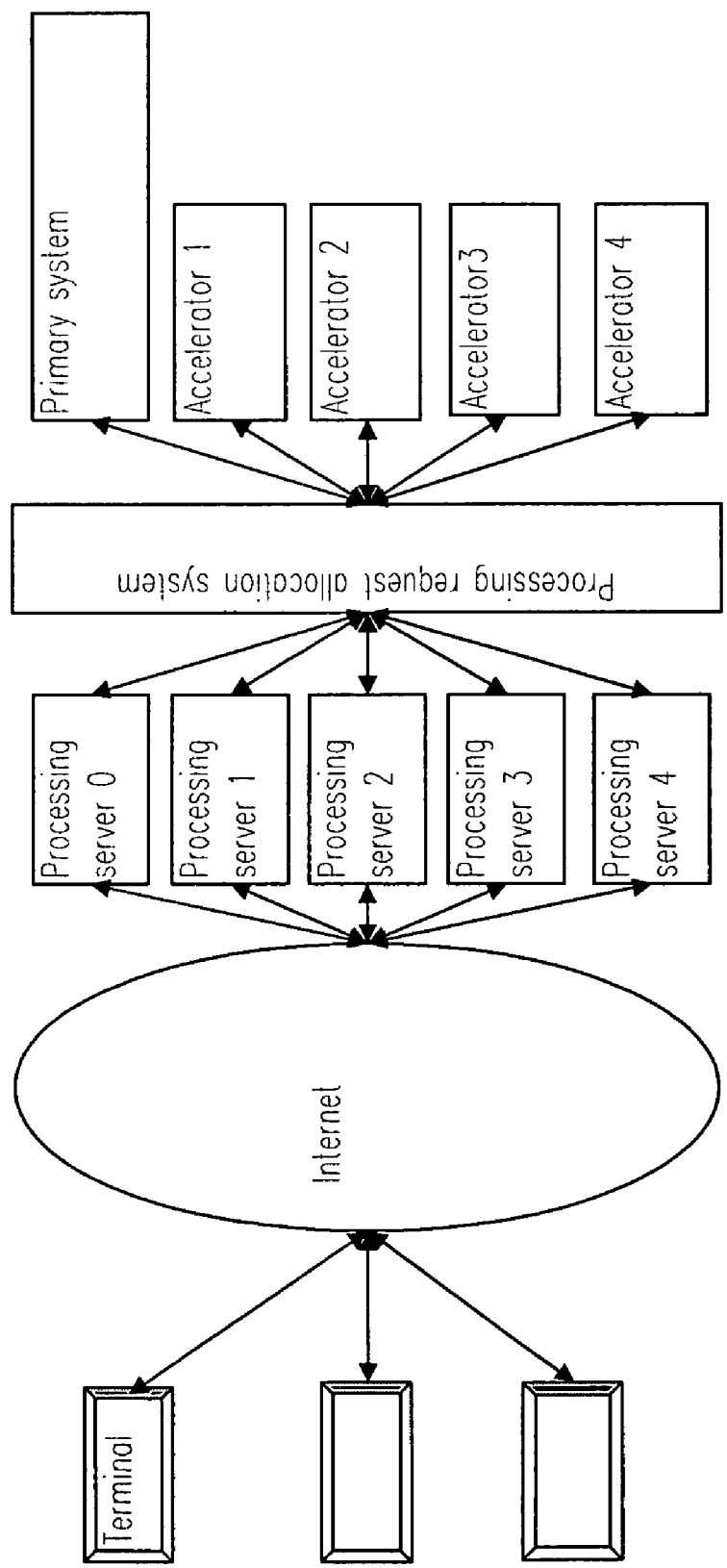
FIG. 21 is an example of request allocation using a request allocation system.

A processing request to a data storage and retrieval system consists of one set of this information. The recitation of allocation makes reference to FIGS. 20, 21 and 22. FIGS. 20 and 21 show the Internet used to transmit processing requests from terminals, other implementations may have a configuration that uses private lines or a LAN instead of the Internet.

The drawing in FIG. 21 illustrates the use of a load balancer to allocate processing requests. A load balancer makes multiple servers appear to share the same IP address and allocates connections from multiple terminals among the multiple servers. Here, a primary system or accelerator system has a permanent connection with a processing server (often generally termed an application server).

When symmetrical accelerator systems are used, a load balancer is not a problem, but when asymmetrical accelerator systems are used, they cannot be run with a load balancer. The reason why is that some accelerator systems do not have a specific alternate key. In such cases, it is advantageous to use a processing request allocation system such as that shown in FIG. 21. The detailed recitation of the operation of a processing request allocation system makes reference to FIG. 22. A processing request allocation system selects from among the primary system and the accelerators at each processing request rather than maintaining permanent connections, as does a load balancer.

Figure 22:
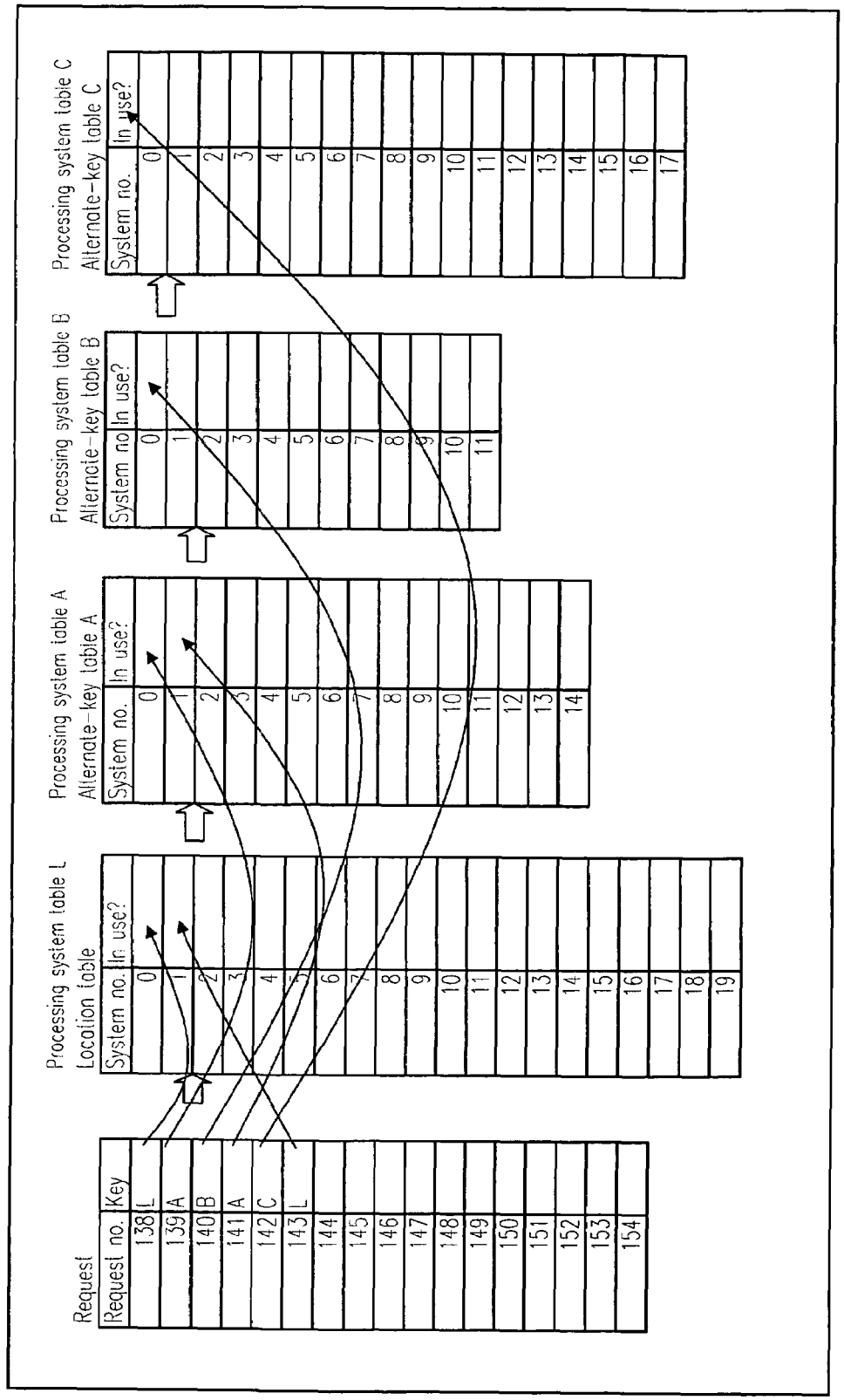
FIG. 22 is an example of the logic of request allocation using a request allocation system.

The processing requests in FIG. 22 are represented only by serial numbers and queue type. Other information is reckoned to belong to these. Processing requests should have the queue structure that is commonly in use. FIG. 22 gives four processing system tables. These are a processing system table L for a location table, a processing system table A for an alternate-key table A, a processing system table B for an alternate-key table B and a processing system table C for an alternate-key table C.

The entries in each processing system table (processing system table entries) correspond to the respective accelerator systems, and FIG. 22 shows 19 accelerator systems for the location table, 14 accelerator systems for the alternate-key table A, 11 accelerator systems for the alternate-key table B and 17 accelerator systems for the alternate-key table C.

The entries in each processing system table are comprised of a processing system number and a processing flag. A processing system number that is zero represents the primary system, and processing system numbers that are positive integers beginning with 1 represent accelerator systems. A processing flag indicates whether that system is processing the processing request or is in a non-processing state.

The outline arrows in FIG. 22 indicate the most recent numbers of the systems to show whether it is the primary system or which of the accelerator systems that is running processing in each of the processing system tables. Zero represents the primary system, and positive integers beginning with 1 represent the accelerator systems. These arrows are termed processing system pointers. Since one of these processing system pointers must be maintained for each table (key), they consist of a processing system pointer L for the location table, a processing system pointer A for the alternate-key table A, a processing system pointer B for the alternate-key table B and a processing system pointer C for the alternate-key table C.

Processing system pointers are initialized to point to the top of their respective processing system tables, but each time a processing request is allocated then point to the next entry. When it points to after the final entry in its table, a processing system pointer returns to the top.

Thus, processing requests are allocated evenly among the accelerators.

FIG. 22 illustrates the state after the positions of the processing system pointers have shifted in order to show the state after allocation of processing requests. Although system numbers are assigned serially here, they may also be assigned with some numbers skipped.

Processing request 138 is a processing request to the location table. Assume that no processing requests had been processing at the point when this processing request arrived. Processing request 138 references the processing system table L (depicting the location table) in the drawing. Since this processing request was generated when no processing requests had been processing, the processing request allocation system raises the processing flag of the entry the processing system number 0 of the processing system table L. Next, the processing system pointer moves to processing system number 1. Next, system number 0 is allocated to the processing request 138 and processing request 138 is transmitted to the primary system.

The primary system performs processing on the location table on the basis of processing request 138 and, once the processing has completed, notifies the allocation system that processing request 138 has been completed. Thus notified of completion by the primary system, the allocation system sets the processing flag of the processing system number 0 of the processing system table L to not-processing.

Processing request 139 is a request to the alternate-key table A and so references processing system table A. Since processing system pointer A is pointing to the top of the processing system table, processing request 139 is allocated to the primary system.

Since these allocation operations need not wait for the completion of processing request 138 and may execute immediately allocation of processing request 138 is completed, they may be performed at high speed.

Likewise, processing request 140 is a processing request to the alternate-key table B and so references the processing system table B. Since the processing system pointer B points to the top of the processing system table, processing request 140 is allocated to the primary system.

Subsequent operations are likewise to those for processing request 138. The processing system pointers are designed to return to the top of their tables once they point to the end of a processing system table. When the system processing number indicated by a processing system pointer is processing when it returns to the top of its table, it may either wait for the next request or sequentially search the systems to find a system that is not processing, allocate a request to that system and move the processing system pointer there. There is a possibility of a temporary loop if the latter method is adopted, but since whenever one of the processing requests allocated in the processing system table completes the processing flag of that system number in the processing system table is set to not-processing, there will be no infinite loop. Another method is for a processing pointer to wait momentarily and then again search for a processing system table entry with a not-processing state after cycling through its processing system table. It is further advantageous to add an accelerator with a specific key when such circumstances arise.

Figure 23:
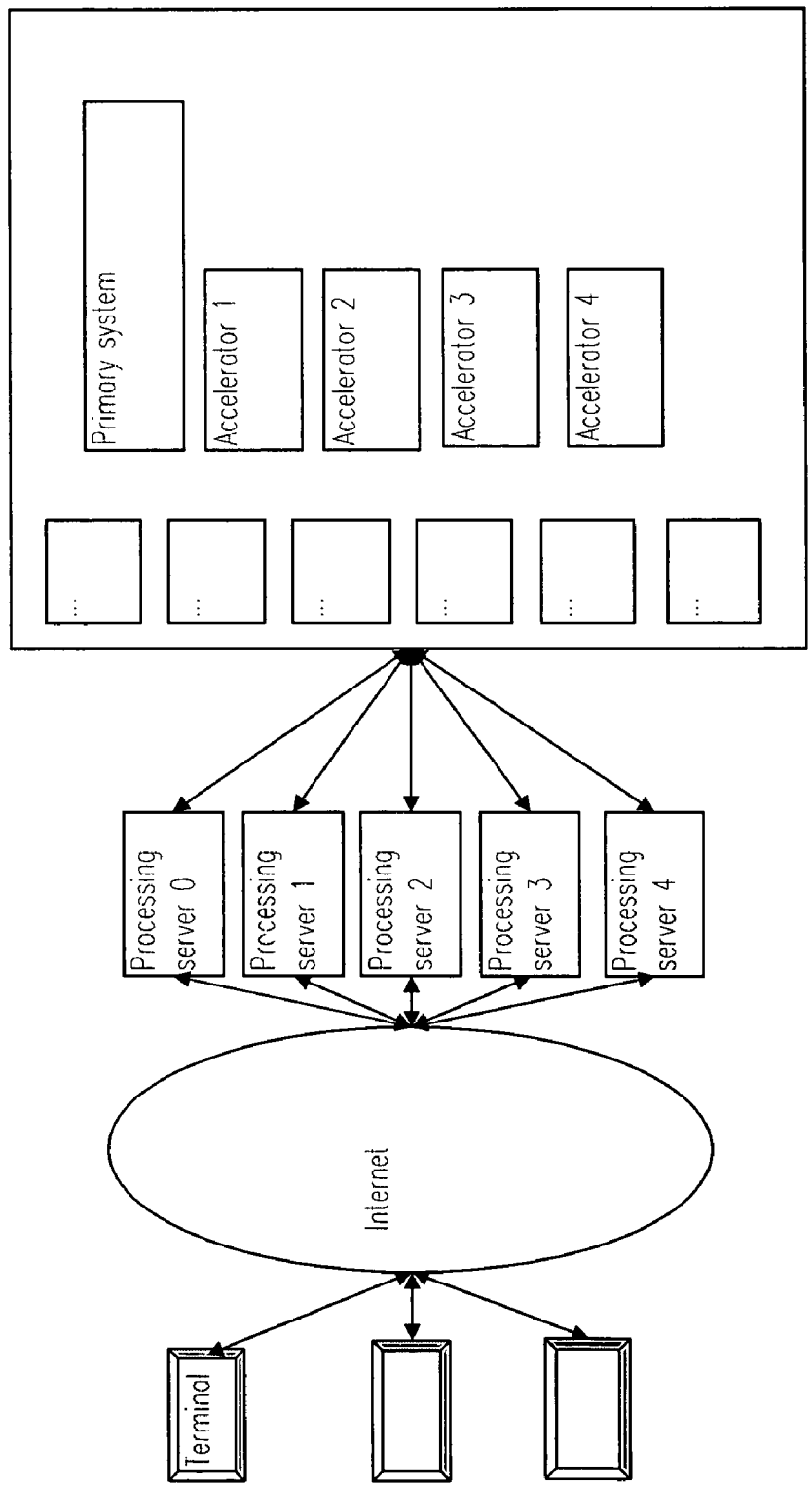
FIG. 23 is an example of a primary system and an accelerator system stored on the same hardware system.

Additional to the recitation foregoing, the recitation addresses an example of an accelerator system deployed as software with reference to FIG. 23. A primary system and an accelerator system are stored on the same hardware system, and this hardware system is equipped with multiple CPUs. Each CPU is assigned by the operating system to the primary system or the accelerator system. In addition to a location table and alternate-key location tables, the primary system should have a modification information transmission mechanism. The accelerator system has a frond location table and frond alternate-key location tables, but in an asymmetrical system the primary system and accelerator system may have different configurations.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A computer system comprising a data storage space, containing a database accelerator, that is comprised of:
a processor; a primary system that holds data records having data items including primary keys; said primary system includes:
a primary blocks that store the data records in the order of their primary keys; and a location table that is positioned in a contiguous region and contains location table entries where said location table entries contain addresses of at least one primary block; any due to all modifications to the location table caused by data addition, update, and deletion causing a data modification within the block; said primary system transmits said modifications and a content of modification to an accelerator system; and the accelerator system that has a frond location table holding contiguous frond location table entries indicating the blocks that are identical to the location table entries of each primary block; said accelerator system has:
a communication mechanism that receives the modification information from the primary system due to the modification within the block because of the data addition, update, and data deletion; a modification information application mechanism that performs necessary updating based on the modification information transmitted from the primary system; and retrieval mechanism using the primary key in said accelerator system where the accelerator system frond location table is used to perform a binary search to retrieve the frond location table entries with a target key value to determine an object block and that retrieval relative to the record within the block is performed relative to the primary block or overflow block in the primary system.

2. A computer system comprising a data storage, containing a database accelerator, that is comprised of:
a processor; a primary system that holds data having data items including primary keys and alternate keys; primary blocks that store the data records in the order of their primary keys; alternate key blocks that stores the alternate-key entries made up of alternate keys and primary keys in the alternate-key value order; and an alternate-key location table that contains the alternate-key location table entry in a contiguous region; said primary system transmits information of a location of any modification in the alternate-key location table such as alternate-key location table entry number and a content of modification to an accelerator system upon modifying alternate-key location table as the alternate-key entry within the alternate-key block is modified in the case that alternate-key modification occurs due to data addition, update, and deletion causing a data modification within the block; and an accelerator system that has: a communication mechanism that receives modification information from the primary system regarding any modification to the alternate key location table due to data addition, update, and deletion causing data modification within the alternate-key block while transmitting information for completing the application of the modification information to the primary system upon completion of the modification information; and a modification information application mechanism that performs necessary updating based on the modification information transmitted from the primary system; and retrieval using the alternate-key in said accelerator system is such that the accelerator system frond alternate key location table is used to perform a binary search to retrieve the frond alternate-key location table entries with a target key value to determine an object alternate-key block and that retrieval relative to the record within the alternate-key block is performed relative to the alternate-key block in the primary system.

* * * * *